(12) United States Patent
Guizilini et al.

(10) Patent No.: US 12,333,744 B2
(45) Date of Patent: Jun. 17, 2025

(54) SCALE-AWARE SELF-SUPERVISED MONOCULAR DEPTH WITH SPARSE RADAR SUPERVISION

(71) Applicant: TOYOTA RESEARCH INSTITUTE, INC., Los Altos, CA (US)

(72) Inventors: Vitor Guizilini, Santa Clara, CA (US); Charles Christopher Ochoa, San Francisco, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 531 days.

(21) Appl. No.: 17/578,830

(22) Filed: Jan. 19, 2022

(65) Prior Publication Data

US 2023/0230264 A1 Jul. 20, 2023

(51) Int. Cl.
*G06T 7/50* (2017.01)
*G01B 15/00* (2006.01)
(Continued)

(52) U.S. Cl.
CPC .............. *G06T 7/50* (2017.01); *G01B 15/00* (2013.01); *G01S 13/89* (2013.01); *G06T 3/40* (2013.01);
(Continued)

(58) Field of Classification Search
CPC ... G06T 7/50; G06T 3/40; G06T 2207/10028; G06T 2207/20081; G06T 2207/10016;
(Continued)

(56) References Cited

U.S. PATENT DOCUMENTS

| | | |
|---|---|---|
| 2020/0167941 A1 | 5/2020 | Tong |
| 2021/0004660 A1 | 1/2021 | Ambrus |

(Continued)

FOREIGN PATENT DOCUMENTS

| | | |
|---|---|---|
| CN | 111753961 A | 10/2020 |
| CN | 113205549 A | 8/2021 |

OTHER PUBLICATIONS

"Yevhen Kuznietsov et. al., Semi-Supervised Deep Learning for Monocular Depth Map Prediction, 2017, Proceedings of the IEEE Conference on Computer Vision and Pattern Recognition CVPR, pp. 6647-6655" (Year: 2017).*

(Continued)

*Primary Examiner* — Andrae S Allison
*Assistant Examiner* — Phuong Hau Cai
(74) *Attorney, Agent, or Firm* — SHEPPARD, MULLIN, RICHTER & HAMPTON LLP; Daniel N. Yannuzzi

(57) ABSTRACT

Systems and methods are provided for training a depth model to recover scale factor for self-supervised depth estimation in monocular images. Examples include deriving a depth map for an image based on a depth model. The depth map comprises depth values for pixels of the image. A first scale for the image can be estimated based on the depth values, and depth data captured by a range sensor can be received. The depth data comprises a point cloud comprising depth measures. A second scale for the point cloud can be determined based on the depth measures and a scale factor can be determined based the second scale and the first scale. The depth model can be updated based on the scale factor, wherein the depth model generates metrically accurate depth estimates based on the scale factor.

20 Claims, 9 Drawing Sheets

(51) Int. Cl.
*G01S 13/89* (2006.01)
*G06T 3/40* (2024.01)

(52) U.S. Cl.
CPC .............. *G06T 2207/10028* (2013.01); *G06T 2207/20081* (2013.01)

(58) Field of Classification Search
CPC . G06T 2207/20084; G06T 2207/30261; G06T 7/55; G01B 15/00; G01S 13/89; G01S 7/4808; G01S 17/86; G01S 13/862; G01S 13/865; G01S 13/867; G01S 13/881; G01S 13/08
See application file for complete search history.

(56) References Cited

U.S. PATENT DOCUMENTS

2021/0004974 A1  1/2021  Guizilini
2021/0183083 A1  6/2021  Yan
2021/0237764 A1  8/2021  Tang

OTHER PUBLICATIONS

"Sumyeong Lee et. al., Robust 3-Dimensional Point Cloud Mapping in Dynamic Environment Using Point-wise static Probability-Based NDT Scan-Matching, Sep. 2020, IEEE Access, vol. 8" (Year: 2020).*
"Lingfei Ma et. al., Multi-Scale Point-Wise Convolutional Neural Networks for 3D Object Segmentation From LiDAR Point Clouds in Large-Scale Environments, Dec. 2019, IEEE Transactions on Intelligent Transportation Systems, vol. 22, Issue 2" (Year: 2019).*
"Qian Shi et. al., A Deeply Supervised Attention Metric-Based Network and an Open Aerial Image Dataset for Remote Sensing Change Detection, Jun. 2021, IEEE Transactions on Geoscience and Remote Sensing, vol. 60" (Year: 2021).*
Patil et al., "Don't Forget the Past: Recurrent Depth Estimation from Monocular Video," 2020 IEEE/RSJ International Conference on Intelligent Robots and Systems (IROS), Oct. 2020, 8 pages (http://ras.papercept.net/images/temp/IROS/files/2955.pdf).
Mitra, "Monocular Depth Estimation using Adversarial Training," Master's thesis, University of Minnesota, Jun. 2020, 72 pages (https://irvlab.cs.umn.edu/sites/irvlab.dl.umn.edu/files/mitra_msc_thesis_monogan.pdf).

* cited by examiner

SCALE-AWARE SELF-SUPERVISED MONOCULAR DEPTH WITH SPARSE RADAR SUPERVISION

TECHNICAL FIELD

The present disclosure relates generally to systems and methods for depth estimation from images, and in particular, to training a depth model sparse range sensor data to recover scale factor for self-supervised depth estimation in monocular images.

DESCRIPTION OF RELATED ART

Various devices that operate autonomously or that provide information about a surrounding environment use sensors that facilitate perceiving obstacles and additional aspects of the surrounding environment. For example, a robotic device may use information from the sensors to develop an awareness of the surrounding environment in order to navigate through the environment. In particular, the robotic device uses the perceived information to determine a 3-D structure of the environment in order to identify navigable regions and avoid potential hazards. The ability to perceive distances through estimation of depth using sensor data provides the robotic device with the ability to plan movements through the environment and generally improve situational awareness about the environment.

However, depending on the available onboard sensors, the robotic device may acquire a limited perspective of the environment, and, thus, may encounter difficulties in distinguishing between aspects of the environment.

That is, various sensors perceive different aspects of the environment differently and also have different implementation characteristics. For example, a light detection and ranging (LiDAR) sensor is effective at perceiving depth in the surrounding environment but suffers from difficulties such as high costs and can encounter errors in certain weather conditions, while radar sensors suffer from sparsity and noise. Moreover, other sensors, such as stereo cameras, function to effectively capture depth information but also suffer from difficulties with cost, limited field-of-view, and so on. While monocular cameras can be a cost-effective approach, the sensor data from such cameras does not explicitly include depth information. Instead, the robot implements processing routines that derive depth information from the monocular images.

However, leveraging monocular images to perceive depth can also suffer from difficulties such as limited resolution, image artifacts, difficulties with training the processing routines (e.g., expensive or limited availability of training data), and so on. As such, many difficulties associated with determining depth data persist that may result in reduced situational awareness for a device, and, thus, difficulties in navigating or performing other associated functions. Many approaches to monocular depth estimation estimate up to an unknown scale factor with the scale applied as a post-processing step at, for example, test time. As such, many difficulties associated with determining depth data persist such as scale ambiguities and other difficulties that may result in reduced situational awareness for a device, and, thus, difficulties in navigating or performing other associated functions.

BRIEF SUMMARY OF THE DISCLOSURE

According to various embodiments of the disclosed technology, systems and methods for training a depth model sparse range sensor data are provided to recover scale factor for self-supervised depth estimation in monocular images.

In accordance with some embodiments, a method for depth estimation from monocular images is provided. The methods comprises receiving an image captured by an image sensor, the image comprising pixels representing a scene of an environment; deriving a depth map for the image based on a depth model, the depth map comprising predicted depth values for a plurality of the pixels of the image; estimating a first scale for the image based the plurality of predicted depth values; receiving depth data captured by a range sensor, the depth data comprising a point cloud representing the scene of the environment, the point cloud comprising depth measures for a plurality of points of the point cloud; determining a second scale for the point cloud based on the depth measures; determining a scale factor based on a comparison of the second scale with the first scale; and updating the depth model based on the scale factor, wherein the depth model generates metrically accurate depth estimates based on the scale factor.

In another aspect, a system is provided that comprises a memory and one or more processors that are configured to execute machine readable instructions stored in the memory for performing a method. The method comprises training a depth model at a first stage according to self-supervised photometric losses generated from at least a first monocular image; determining a single scale factor from a depth map of the first monocular image and a sparse point cloud generated by a range sensor; and training the depth model at a second stage according to a supervised loss based on the single scale factor, wherein the depth model trained according to the second stage generates metrically accurate depth estimates of monocular images based on the single scale factor.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
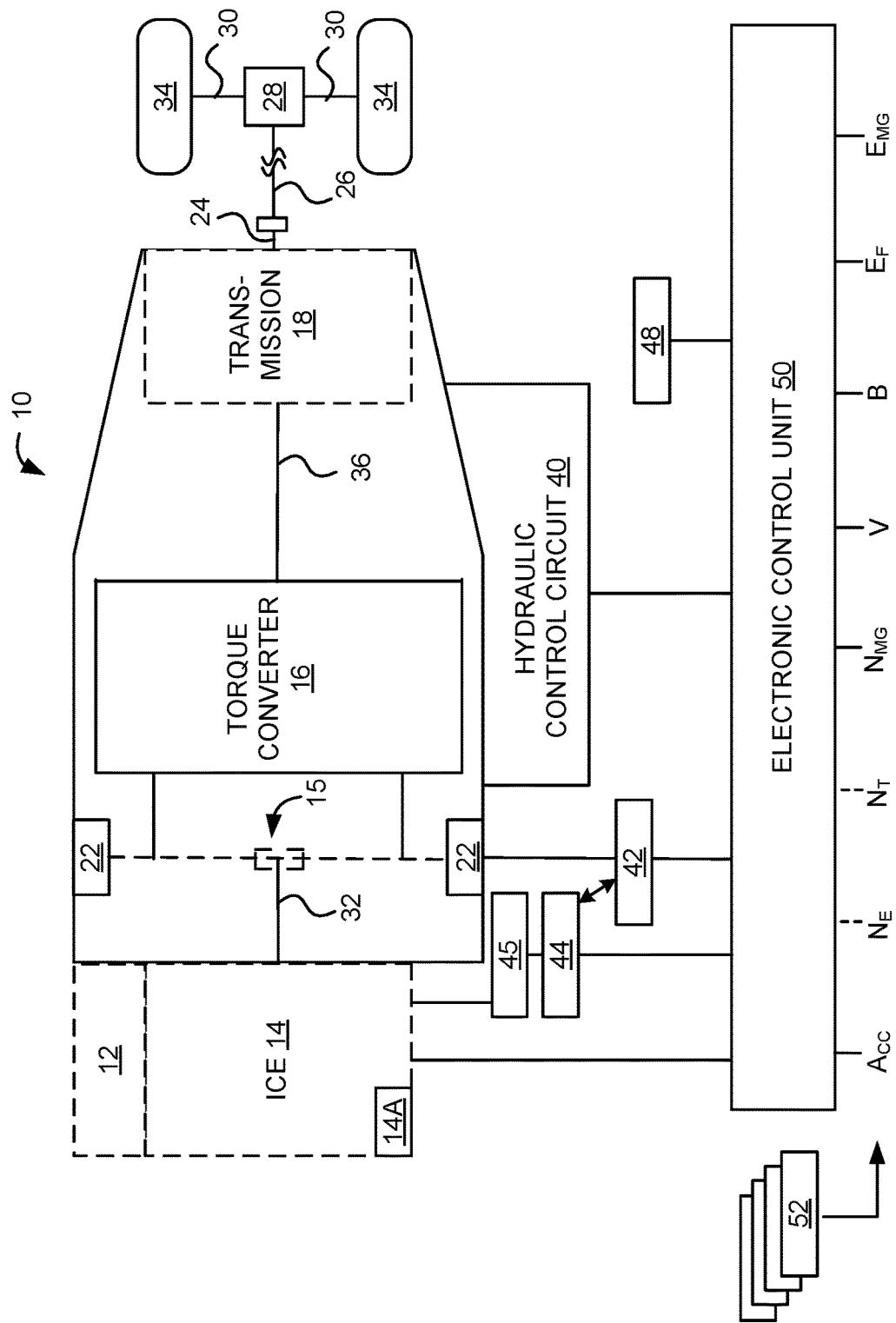
FIG. 1 is a schematic representation of an example vehicle with which embodiments of semi-supervised scale-aware learning systems and methods disclosed herein may be implemented.

The figures are not exhaustive and do not limit the present disclosure to the precise form disclosed.

DETAILED DESCRIPTION

Embodiments of the systems and methods disclosed herein can provide for training a depth model to derive depth estimates from monocular images. For example, embodiments of the present disclosure may utilize sparse depth data from a range sensor as additional information to recover a scale factor and refine a self-supervised monocular depth estimation from monocular image sources.

Embodiments of the present disclosure utilize a combination of self-supervised photometric loss derived from images and sparse depth data from range sensors to supervise a scale of the images and align the scale with that of the range sensor. In various embodiments, the images are captured by monocular image sensors. As previously noted, perceiving aspects of the surrounding environment can represent different challenges depending on which sensors a device employs to support the endeavor. In particular, difficulties with using monocular image sensors to perceive depths in the surrounding environment can complicate the use of such sensors. For example, because a system trains and implements additional routines to derive the depth data from monocular images, difficulties can arise in relation to incomplete depth data and/or aberrations in the derived depth data from characteristics of the processing approach (e.g., scale ambiguity). The difficulties can cause the depth estimates to be unreliable for resolving aspects of the environment, thereby resulting in an incomplete situational awareness of the environment.

Therefore, embodiments herein employ a training architecture to support semi-supervised training from a combination of monocular images and sparse depth data to overcome the noted difficulties. Some embodiments disclosed herein include two stages that involve both self-supervised learning on images to obtain losses (e.g., photometric loss) and semi-supervised learning to recover the scale. Whereas various approaches to supervised training of a depth model may use comprehensive depth maps (e.g., nearly per-pixel annotations) that correlate with images or may use stereo images to provide self-supervision of a training process, the embodiments herein implement the training architecture on monocular images in the first stage, thereby avoiding a need for specialized sensors, and sparse depth data in the second stage as additional ground truth information thereby using depth labels from less expensive range sensors. Thus, the embodiments herein improve the training process by using standard monocular image sensors (e.g., cameras) to capture monocular images, and supplementing the self-supervised training with the second stage that refines the depth model using sparse depth data to supervise the second stage.

For example, because annotated training data can be expensive to produce due to the use of expensive sensors (e.g., 64 beam LiDAR devices), and/or manual labeling processes, and because monocular video alone under a self-supervised process may result in scale ambiguities in the understanding of the trained depth model, embodiments herein overcome the noted difficulties by using sparse depth data to supervise a refining stage (i.e., the second stage) without reliance on more comprehensive/dense depth data from depth sensors having a high fidelity.

The sparse depth data is, in one embodiment, radar data (e.g., a point cloud) from a radar device that produces a sparsely populated perception of the surrounding environment. As opposed to providing a LiDAR device with a multiplicity of scanning beams that provide depth data at nearly a per-pixel level with a corresponding image, the depth system uses radar to produce sparse depth data. Consequently, the training architecture relies on the self-supervised training using monocular images, but improves the self-supervised process with the additional refinement second stage that uses less complex and, thus, more easily acquired depth data to improve the training process. In this way, the semi-supervised training with weak supervision improves the ability of the depth model to infer metrically accurate depths without using extensively annotated training data.

However, because radar depth data can be noisy, instead of applying semi-supervised training on a pixel-by-pixel basis (e.g., pixel-wise) as with LiDAR depth data, embodiments disclosed herein estimate a single scale the radar depth data (e.g., a single scale for an entire point cloud) and refines the self-supervised depth model using the estimated scale by aligning a scales factor of the monocular image with the estimate scale. The determination may be based, for example, a measure of central tendency of scale of points in of the point cloud. A measure of central tendency, as used herein, refers to a measure of a central or typical value for probability distribution and may refer to, for example, an arithmetic average (or mean), weighted average, median, mode, and the like. Estimating scale on a point-basis (e.g., a scale for each point cloud) may be provide for improved performance over pixel-wise application of radar depth date, since the estimate averages out potential sources of error (e.g., uncertainty due to noise in the detection results). In some embodiments, weights may be determined based on uncertainty in the radar depth data, for example, higher uncertainty corresponds to smaller weights. The weighted average is updated with new valid depth pixel, relative to the corresponding monocular depth estimate. In some embodiments, a single scale may be estimated for multiple sets of radar data (e.g., a plurality point clouds across varying environment scenes), for example, where the uncertainty or error in the radar data is greater than a determined threshold. The estimated scale for the plurality of sets (referred to herein as an aggregate scale) may train the depth model to enforce consistency in scale across self-supervised monocular outputs. Accordingly, depth maps generated by a learned depth model for different timesteps may be scale-consistent, if not scale-aware. Accordingly, embodiments herein provide for scale-aware self-supervised depth models by leveraging radar data to obtain a single scale factor to produce metrically accurate depth estimates in monocular images.

Accordingly, embodiments disclosed herein implement a two-stage training process with the first stage including self-supervised learning on images and a second stage including the semi-supervised learning that uses sparse depth data to generate a single scale factor to refine training of the depth model. In this way, the disclosed embodiments provide for semi-supervised training that improves the understanding of the depth model while avoiding a need for denser annotated depth data to provide scale-aware depth estimates.

The systems and methods disclosed herein may be implemented with any of a number of different vehicles and vehicle types. For example, the systems and methods disclosed herein may be used with automobiles, trucks, motorcycles, recreational vehicles and other like on- or off-road vehicles. In addition, the principals disclosed herein may also extend to other vehicle types as well.

An example hybrid electric vehicle (HEV) in which embodiments of the disclosed technology may be implemented is illustrated in FIG. 1. Although the example described with reference to FIG. 1 is a hybrid type of vehicle, the systems and methods for process of semi-supervised scale-aware learning of a depth model for monocular depth estimation can be implemented in other types of vehicle including gasoline- or diesel-powered vehicles, fuel-cell vehicles, electric vehicles, or other vehicles.

FIG. 1 illustrates a drive system of vehicle 10 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

Vehicle 10 may be driven/powered with either or both of engine 14 and motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be a hybrid electric vehicle (HEV) travel mode that uses engine 14 and the motor(s) 22 as the sources of motive power. In the engine-only and HEV travel modes, vehicle 10 relies on the motive force generated at least by internal combustion engine 14, and clutch 15 may be included to engage engine 14. In the EV travel mode, vehicle 10 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from electronic control unit 50, described below. Such output control can include, for example, throttle control, fuel injection control, and ignition timing control.

Motor 22 can also be used to provide motive power in vehicle 10 and is powered electrically via battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move vehicle 10 and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of vehicle 10. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 10 may include electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units or using a single electronic control unit.

In the example illustrated in FIG. 1, electronic control unit 50 receives information from a plurality of sensors included in vehicle 10. For example, electronic control unit 50 may receive signals that indicate vehicle operating conditions or characteristics, or signals that can be used to derive vehicle operating conditions or characteristics. These may include, but are not limited to accelerator operation amount (ACC), a revolution speed ($N_E$), of internal combustion engine 14 (engine RPM), a rotational speed of the motor 22 (motor rotational speed), and vehicle speed, NV. These may also include torque converter 16 output (e.g., output amps indicative of motor output), brake operation amount/pressure, B, battery (i.e., the charged amount for battery 44 detected by an system on chip (SOC) sensor). Accordingly, vehicle 10 can include a plurality of sensors 52 that can be used to detect various conditions internal or external to the vehicle and provide sensed conditions to electronic control unit 50 (which, again, may be implemented as one or more individual control circuits). In one embodiment, sensors 52 may be included to detect one or more conditions directly or indirectly such as, for example, fuel efficiency ($E_F$), motor efficiency ($E_{MG}$), hybrid (e.g., ICE 14 and MG 12) efficiency, acceleration, ACC, etc.

Additionally, one or more sensors 52 can be configured to detect, and/or sense position and orientation changes of the vehicle 10, such as, for example, based on inertial acceleration, trajectory, and so on. In one or more arrangements, electronic control unit 50 can obtain signals from vehicle sensor(s) including accelerometers, one or more gyroscopes, an inertial measurement unit (IMU), a dead-reckoning system, a global navigation satellite system (GNSS), a global positioning system (GPS), a navigation system, and/or other suitable sensors. In one or more arrangements, electronic control unit 50 receives signals from a speedometer to determine a current speed of the vehicle 10.

Sensors 52 may be included to detect not only vehicle conditions but also to detect environment conditions external and/or internal to the vehicle. Sensors that might be used to detect external conditions can include, for example, distance measuring sensors or range sensors (e.g., sonar, radar, LiDAR, infra-red cameras, and the like), vehicle proximity sensors, and image sensors (e.g., cameras or other image sensors). In some embodiments, cameras can be high dynamic range (HDR) cameras or infrared (IR) cameras. Image and range sensors can be used to detect the environment surrounding the vehicle 10, for example, traffic signs, road curvature, obstacles, and so on. Still other sensors may include those that can detect road grade.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output. Additionally, as alluded to above, the one or more sensors 52 can be configured to detect, and/or sense in real-time. As used herein, the term "real-time" means a level of processing responsiveness that a user or system senses as sufficiently immediate for a particular process or determination to be made, or that enables the processor to keep up with some external process.

According to an embodiment, vehicle 10 can be an autonomous vehicle. As used herein, "autonomous vehicle" can refer to a vehicle that is configured to operate in an autonomous operational mode. "Autonomous operational mode" can refer to the use of one or more computing systems of the vehicle 10 to navigate and/or maneuver vehicle 10 along a travel route with a level of input from a human driver which can vary with the operational mode, for example, based on information detected by sensors 52. As such, vehicle 10 can have a plurality of autonomous operational modes. In some embodiments, vehicle 10 can have an unmonitored autonomous operational mode, meaning that one or more computing systems are used to maneuver vehicle 10 along a travel route fully autonomously, requiring no input or supervision required from a human driver.

Alternatively, or in addition to the above-described modes, vehicle 10 can have one or more semi-autonomous operational modes. "Semi-autonomous operational mode" can refer to mode whereby a portion of the navigation and/or maneuvering of vehicle 10 along a travel route is performed by one or more computing systems, for example, based on information detected by sensors 52, while a portion of navigation and/or maneuvering of vehicle 10 along the travel route is performed by a human driver. One example of a semi-autonomous operational mode is an adaptive cruise control system. In such case, the speed of vehicle 10 can be automatically adjusted to maintain a safe distance from a vehicle ahead based on data received from on-board sensors, but vehicle 10 is otherwise operated manually by a human driver. Another example of a semi-autonomous operational mode include Advanced Driver-Assistance Systems (ADAS), such as, forward/rear collision detection and warning systems, pedestrian detection systems, etc.

The example of FIG. 1 is provided for illustration purposes only as an example of vehicle systems with which embodiments of the disclosed technology may be implemented. Embodiments herein are not limited to automobiles. For example, embodiments herein may be implemented in any electronic/robotic device or another form of powered transport that, for example, perceives an environment according to environment sensors. Additionally, embodiments herein may be implemented in a statically mounted device, an embedded device, or another device that uses environment sensor data to derive depth information about a scene or that separately trains the depth model for deployment in such a device. For example, embodiments herein may be implemented in a server (e.g., a physical, dedicated sever or a cloud-based server coupled to a database resident on network), and the resulting depth model may be communicated to other remote devices for use in autonomous and/or semi-autonomous operational modes. Thus, one of ordinary skill in the art reading this description will understand how the disclosed embodiments can be implemented with any vehicle, robotic, and/or computation platform.

Figure 2:
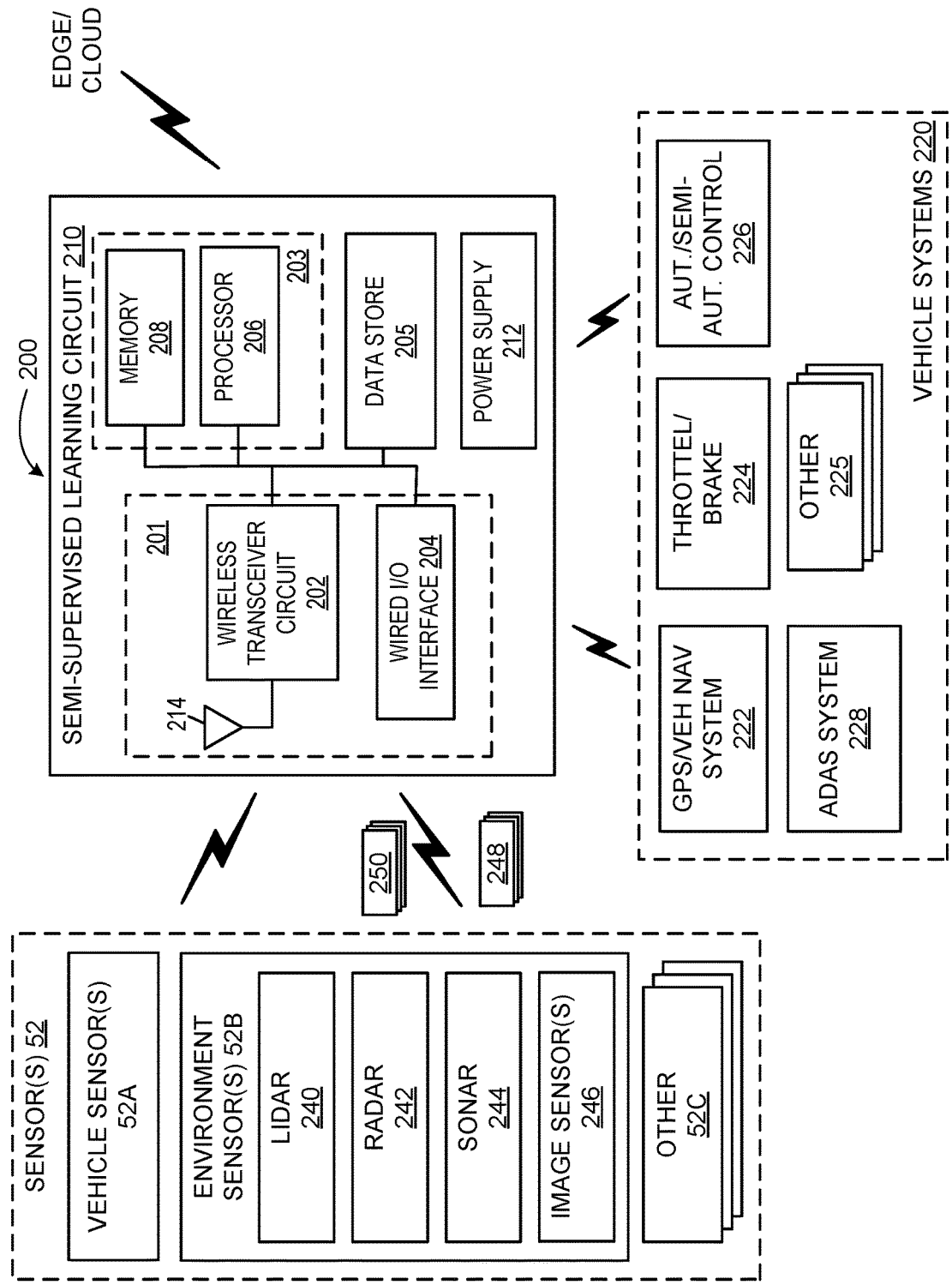
FIG. 2 illustrates an example architecture for semi-supervised scale-aware learning in accordance with embodiments of the systems and methods described herein.

FIG. 2 illustrates an example architecture for semi-supervised scale-aware learning in accordance with one embodiment of the systems and methods described herein. In this example, system 200 includes a semi-supervised learning circuit 210, the plurality of sensors 52, and one or more vehicle systems 220. Sensors 52 and vehicle systems 220 can communicate with semi-supervised learning circuit 210 via a wired or wireless communication interface. semi-supervised learning circuit 210 can be implemented, for example, as an ECU or as part of an ECU such as, for example ECU 50 of vehicle. In other embodiments, semi-supervised learning circuit 210 can be implemented independently of an ECU, for example, as a standalone computing component (e.g., cloud-based server resident on a network, physical or dedicated server, software-as-a-service (SaaS), distributed computing service, etc.).

Semi-supervised learning circuit 210, in this example, includes a communication circuit 201, a decision circuit 203 (including a processor 206 and memory 208 in this example), data store 205, and a power supply 212. Components of semi-supervised learning circuit 210 are illustrated as communicating with each other via a data bus, although other communication in interfaces can be included.

Processor 206 can include a GPU, CPU, microprocessor, or any other suitable processing system. Memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208 can be made up of one or more modules of one or more different types of memory and may be configured to store data and other information as well as operational instructions that may be used by the processor 206 to control semi-supervised learning circuit 210. For example, memory 208 may store one or more modules, for example, as computer-readable instructions that when executed by the processor 206 cause the processor 206 to perform the various functions and operations of the semi-supervised learning circuit 210.

Data store 205 may be an electronic data structure such as a database. The data store 205 may be stored in the memory 208 or another memory. The data store 205 may be configured with routines that can be executed by the processor 206 for analyzing stored data, providing stored data, organizing stored data, and so on. Accordingly, the data store 205 may store data used by the processor 206 in executing various functions. The data store 205 may also receive and store data from sensors 52 and/or vehicle systems 220, for example, for use by the processor 206 in executing operations and functions of the semi-supervised learning circuit 210.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a semi-supervised learning circuit 210.

Communication circuit 201 either or both a wireless transceiver circuit 202 with an associated antenna 214 and a wired I/O interface 204 with an associated hardwired data port (not illustrated). As this example illustrates, communications with semi-supervised learning circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by semi-supervised learning circuit 210 to/from other entities, such as, sensors 52, vehicle systems 220, edge devices (e.g., remote network node, edge computing devices, etc.), and the cloud (e.g., cloud-based server resident on network, etc.).

Wired I/O interface 204 can include a transmitter and a receiver (not shown) for hardwired communications with other devices. For example, wired I/O interface 204 can provide a hardwired interface to other components, including sensors 52 and vehicle systems 220. Wired I/O interface 204 can communicate with other devices using Ethernet or any of a number of other wired communication protocols whether standardized, proprietary, open, point-to-point, networked or otherwise.

Power supply 210 can include one or more of a battery or batteries (such as, e.g., Li-ion, Li-Polymer, NiMH, NiCd, NiZn, and NiH$_2$, to name a few, whether rechargeable or primary batteries), a power connector (e.g., to connect to vehicle supplied power, etc.), an energy harvester (e.g., solar cells, piezoelectric system, etc.), or it can include any other suitable power supply.

Sensors 52 can include, for example, those described above with reference to the example of FIG. 1. Sensors 52 can include additional sensors that may or not otherwise be included on a standard vehicle 10 with which the semi-supervised scale-aware learning system 200 is implemented. In the illustrated example, sensors 52 include one or more vehicle sensors 52A. The vehicle sensor(s) 52A can detect, determine, and/or sense information about the vehicle 10. For example, vehicle sensor(s) 52A can be configured to detect, and/or sense position and orientation changes of the vehicle 10, such as, for example, based on inertial acceleration. In various embodiments, the vehicle sensor(s) 52A can include one or more accelerometers (e.g., to detect roll, pitch, and yaw of the vehicle), one or more gyroscopes, an inertial measurement unit (IMU). The vehicle sensor(s) 52A can also be configured to detect, and/or sense one or more characteristics of the vehicle 10. For example, vehicle sensor(s) 52A may include vehicle acceleration sensors, vehicle speed sensors, throttle and brake pedal sensors, steering sensors, wheelspin sensors (e.g., one for each wheel), tire pressure monitoring system (TPMS), proximity sensors, etc.

Sensors 52 also includes environment sensors 52B configured to acquire, and/or sense environment data surrounding the vehicle and/or internal to the vehicle. Environment data includes data or information about the external and/or internal environment in which vehicle 10 is located or one or more portions thereof. For example, the one or more environment sensors 52B can be configured to detect, quantify and/or sense obstacles in at least a portion of the external environment of the vehicle 10 and/or information/data about such obstacles. Such obstacles may be stationary objects and/or dynamic objects. The one or more environment sensors 52B can be configured to detect, measure, quantify and/or sense other things in the external environment, such as, for example, other vehicles, pedestrians, lane markers, signs, traffic lights, traffic signs, lane lines, crosswalks, curbs proximate the vehicle 10, off-road objects, etc. As another example, alone or in addition to the above, the one or more environment sensors 52B can be configured to detect, quantify and/or sense obstacles in at least a portion of the internal environment of the vehicle 10 and/or information/data about such environment.

Environment sensors 52B includes one or more range sensors such as, but not limited to, LiDAR 240, radar 242, sonar 244, IR sensors and other like sensors that can be used to gather data (e.g., data 250) to measure distances and closing rates to various external objects. Environment sensors 52B also includes one or more image sensors 246, such as cameras (e.g., visible light cameras, IR cameras, thermal cameras, ultrasound cameras, and other cameras) or other image sensors, to capture video images 248 of the environment around the vehicle. Information from image sensors 246 can be used, for example, by vehicle systems 220 to determine information about the environment surrounding the vehicle 10 including, for example, information regarding other objects surrounding vehicle 10. For example, image sensors 246 capture video images 248 from which vehicle systems 220 may be able to recognize landmarks or other features (including, e.g., street signs, traffic lights, etc.), slope of the road, lines on the road, curbs, objects to be avoided (e.g., other vehicles, pedestrians, bicyclists, etc.) and other landmarks or features. Information from image sensors 246 can be used in conjunction with other information such as map data or information from navigation system 222 to determine, refine or verify vehicle location.

In various embodiments, each image sensor 246 is a monocular image sensor configured to capture monocular videos as a plurality of frames in the form of monocular images (e.g., images 248). As described herein, a "monocular image" is an image from a single (e.g., monocular) camera, and encompasses a field-of-view (FOV) of at least a portion of the surrounding environment (e.g., a subregion of the surrounding environment). A monocular image may not include any explicit additional modality indicating depth nor any explicit corresponding image from another camera from which the depth can be derived (e.g., no stereo image sensor pair). In contrast to a stereo image, that may integrate left and right images from separate cameras mounted side-by-side to provide an additional depth channel, a monocular image does not include explicit depth information such as disparity maps derived from comparing the stereo images pixel-by-pixel. Instead, a monocular image may implicitly provide depth information in the relationships of perspective and size of elements depicted therein. The monocular image may be of a forward-facing (e.g., the direction of travel), 60-degree FOV, 90-degree FOV, 120-degree FOV, a rear/side facing FOV, or some other subregion based on the positioning and characteristics of the image sensor 246 on a vehicle (e.g. vehicle 10).

Additional sensors 52C may be provided as well. Various sensors 52 may be used to provide input to semi-supervised learning circuit 210 and other vehicle systems 220 so that the systems have information useful to operate in an autonomous, semi-autonomous or manual mode.

Vehicle systems 220 can include any of a number of different vehicle components or subsystems used to control or monitor various aspects of a vehicle, e.g., vehicle 10, and its performance. In this example, vehicle systems 220 include a GPS or other vehicle positioning system 222; throttle/brake circuits 224 (e.g., to control operation of motor/generator 22, to control the operation of the engine including internal combustion engine 14, and/or control operation of a brake system to decelerate the vehicle); ADAS systems 228 (e.g., to control operation of obstacle detection and warning, forward and/or read collision detection, etc.); autonomous and/or semi-autonomous control systems 226 (e.g., to control operation of navigation and/or maneuvering according to autonomous or semi-autonomous operational modes), and other vehicle systems 282.

During operation, semi-supervised learning circuit 210 can receive information from various vehicle sensors and/or vehicle systems 220 to perform semi-supervised scale-aware learning of a depth model for depth estimation. Communication circuit 201 can be used to transmit and receive information between semi-supervised learning circuit 210 and sensors 52, and semi-supervised learning circuit 210 and vehicle systems 220. Also, sensors 52 may communicate with vehicle systems 220 directly or indirectly (e.g., via communication circuit 201 or otherwise).

In various embodiments, communication circuit 201 can be configured to receive data and other information from sensors 52 that is used in determining training and deploying a scale aware depth model according to embodiment disclosed herein. Additionally, communication circuit 201 can be used to send data and information to various vehicle systems 220 as part of performing operations of the respective vehicle systems 220. The decision regarding what action to take via these various vehicle systems 220 can be made based on the information detected by sensors 52 and application of a trained scale-aware depth model. Examples of this are described in more detail below.

Once trained, the scale-aware depth model may be employed, for example, to analyze images 248 (e.g., monocular images) from an image sensor 246 and provide a depth map 308 to additional vehicle systems 220. For example, processor 206 may generate a scale-aware depth map from images 248 and provide the depth map to the vehicle systems 220. For example, a scale-aware depth map may be provided to ADAS system 228 (e.g., to control operation of obstacle detection and warning, forward and/or read collision detection, etc.), autonomous and/or semi-autonomous control systems 226 (e.g., to control operation of navigation and/or maneuvering according to autonomous or semi-autonomous operational modes), and other operation of the vehicle systems 220.

In another example, a scale-aware depth map may be communicated (e.g., via communication circuit 301) to a remote system (e.g., cloud-based systems, edge devices, etc.) as, for example, a mechanism for mapping the surrounding environment or for other purposes (e.g., traffic reporting, etc.). As yet another example, the depth map 308 may be communicated (e.g., via communication circuit 301) to map locations of obstacles in the surrounding environment and plan a trajectory that safely navigates the obstacles. Thus, the depth map may be used to control the vehicle 10 to navigate through the surrounding environment.

Figure 3:
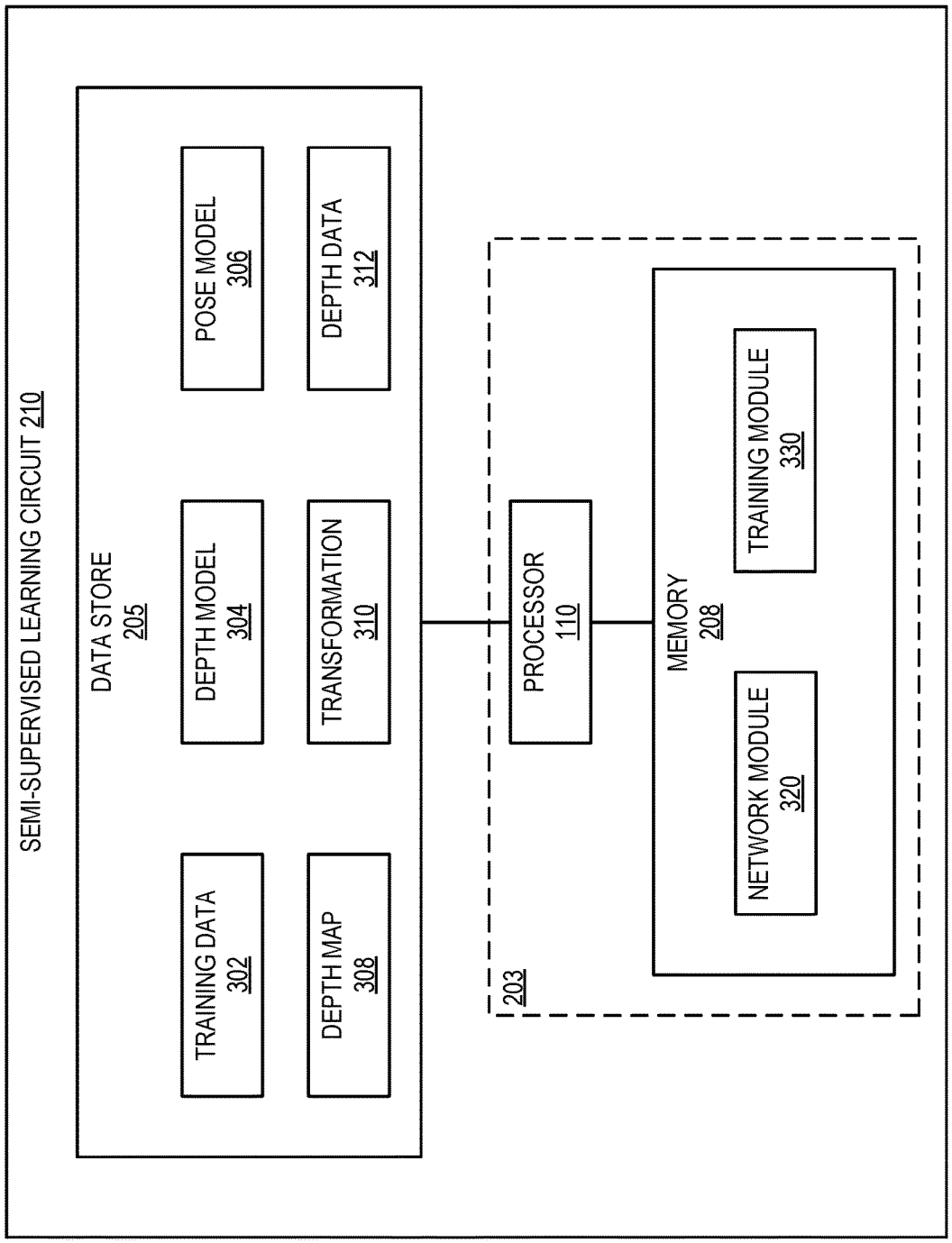
FIG. 3 illustrates a schematic block diagram of an example semi-supervised learning circuit in accordance with embodiments of the systems and methods described herein.

FIG. 3 illustrates a schematic block diagram of an example semi-supervised learning circuit 210 in accordance with embodiments of the systems and methods described herein. As alluded to above, semi-supervised learning circuit 210 may be provided to train and implement a scale-aware depth model to process images (e.g., images 248) and provide depth estimates for an environment (e.g., objects, surfaces, etc.) depicted therein.

Memory 208 may be configured to store, for example, a network module 320 and a training module 330. The modules 320 and 330 are, for example, computer-readable instructions that when executed by the processor 206 cause the processor 206 to perform the various functions disclosed herein. The data store 205 may be configured to store data used by the modules 220 and 230 in executing various functions. In the illustrative example of FIG. 3, the data store 205 stores training data 302, a depth model 304, a depth map(s) 308, a pose model 306, a transformation(s) 310, and depth data 312 along with, for example, other information that is used by the modules 320 and 330.

The training data 302 generally includes one or more monocular videos that are comprised of a plurality of images 248. The monocular images 248 may implicitly provide depth information (e.g., depth values) in the relationships of perspective and size of elements depicted therein from which the depth model 304 may derive the depth map 308. The depth map 308 may comprise a plurality of pixels arranged in two dimensional space (e.g., X and Y) and comprising a depth value derived from the monocular image 248.

The monocular video may also include observations of many different scenes. For example, as the image sensor 246 progresses through an environment, perspectives of objects and features in the environment change, and the depicted objects/features themselves also change, thereby depicting separate scenes (e.g., particular combinations of objects/features). Thus, the semi-supervised learning circuit 210 may extract particular training pairs of monocular images from the monocular video for training. For example, the semi-supervised learning circuit 210 generates pairs from the video so that the pairs of images are of the same or similar scene. As used herein, a "similar scene" is a scene having a threshold amount of overlap in features/objects depicted therein as compared to a scene of another image. As should be appreciated, the video includes a series of monocular images 248 that are taken in succession according to a configuration of the image sensor 246. Thus, the image sensor 246 may generate the images 248 of the video at regular intervals, such at 10 Hz. That is, the image sensor 246 generates an image 248 at a frequency, which may be, for example, 10 Hz. While a specific frequency is describes, any frequency may be used, for example, 30 Hz, 60 Hz, etc. While higher frequencies may require faster algorithms, since the interval between updates is smaller, there are no hard limits or requirements on the frequency at which images 248 are generated.

The semi-supervised learning circuit 210 need not generate pairs from successive images (e.g., adjacent frames). The semi-supervised learning circuit 210 may pair separate images of the same or similar scene that are not successive as training images. Thus, in one example, the semi-supervised learning circuit 210 may pair every other image depending on the capture rate. In another example, the semi-supervised learning circuit 210 may pair every fifth image as a training pair. The greater the timing difference in the video between the pairs, the more pronounced a difference in image sensor position; however, this may also result in fewer shared (e.g., overlapped) features/objects between the images. As such, as previously noted, the pairs of training images are of a same scene and are generally constrained, in one or more embodiments, to be within a defined number of frames (e.g., 5 or fewer) to ensure correspondence of an observed scene between the monocular training images. In any case, pairs of training images have the attributes of being monocular images from a monocular video that are separated by some interval of time (e.g., 0.1 s) such that a perspective of the image sensor changes between the pair of training images as a result of motion of the image sensor through the environment while generating the video.

Additionally, the training data 302, in one or more embodiments, further includes depth data 312 received from a range sensor (e.g., radar sensor 246). The depth data 312 includes depth measures indicating distances from an environment sensor to features in the surrounding environment. The depth data 312 may be provided as a point cloud, which is sparse or generally incomplete for a corresponding scene such that only sparsely distributed points within a scene are annotated by the depth measures as opposed to a depth map that generally provides comprehensive depths for each separate depicted pixel. That is, only those points for which a depth measure is detected by the range sensor are included in point cloud. The point cloud is generally provided in a 3D coordinate space (e.g., X, Y, and Z). Additionally, the depth data may be noisy such that those annotated points within the scene include a degree of error or uncertainty in the depth measurements.

While the depth data 312 is generally described as originating from a radar sensor, the embodiments herein are applicable to depth data from LiDAR or another range sensors. Furthermore, the depth data 312 itself generally includes depth/distance information relative to a point of origin such as the range sensor, and may also include coordinates (e.g., x, y within an image) corresponding with separate depth measurements. An unscaled point cloud may be accurate up to a scale value, and when the point cloud is multiplied by its corresponding scale value it produces metric estimates. This scale is a conversion unit that transforms from the unknown monocular scale to metric scale.

For example, a depth map derived from an image of a scene captured by an image sensor includes a plurality of annotated points generally corresponding to an associated monocular image on a per pixel basis. Thus, the depth map includes separate annotated points for each pixel. By comparison, a range sensor (e.g., a radar sensor 242) may generate a 3D point cloud that can be projected onto a 2D image plane. The projection of the 3D point cloud onto to the image plane provides a sparse number of pixels arranged on the 2D plane having visual attributes based on the depth measurements. For example, a radar sensor 242 may generate a point cloud that when projected to the image plane provides 100 points that are annotated with depth measurements. Radar and LiDAR sensors generate sparse point clouds, with point clouds generated by LiDAR sensors being less sparse than those from radar sensors. The point clouds are sparse because they are obtained by projecting 3D points onto an image plane. Some image pixels won't have any projected point, so they don't have any valid information. Because radar sensors produce fewer points than LiDAR, there will be less information to project and, by extension, fewer valid depth pixels. Furthermore, in the case of radar sensors, the depth measurements for each point is noisy, inherently injecting uncertainty to each depth measure. For example, the noise values can be due to range errors (e.g., a point is closer/further away than measured), or radial errors (e., the point projection is not where it should be). Radar sensors are much noisier radially, relative to LiDAR sensors. Even though the point cloud for a range sensor includes sparse and noisy depth measurements, the information provides for sufficient supervision to facilitate overcoming scale ambiguities within the depth model 304 when used as an additional refinement process for training in combination with a self-supervision process.

As an additional comparison, the depth data within the image, based on depth model 304, is sufficiently dense to convey details of existing features/objects such as vehicles, etc. However, within the projection of the point cloud from the range sensor onto the image plane, the depth data is sparse, noisy and imprecise. The depth data vaguely characterizes the corresponding scene according to distributed points across the scene that do not generally provide detail of specific features/objects depicted therein and includes inherent uncertainty in the depth measurement. Thus, this sparse depth data that is noisy across the scene may not provide enough data for some purposes such as object classification but does provide sufficient information to determine distances of an object and supervise a refinement stage of training the depth model 304.

Furthermore, radar sensors offer cost advantage over other sources of depth information, such as velocity measurements, inertial sensors, LiDAR, camera extrinsic, etc. For example, in the case of LiDAR sensors, while LiDAR may offer more precise depth measurements, the depth measurements collected by LiDAR may represent a significant cost to acquire over a monocular video on an image-by-image basis. These costs and other difficulties generally relate to an expense of a LiDAR sensor that include producing a denser point cloud (e.g., 64 separate beams), difficulties in calibrating LiDAR devices with the monocular camera, storing large quantities of data associated with such a point cloud for each separate image, and so on. Furthermore, radar devices are generally cheaper and consume less energy. Additionally, radar devices are smaller in size for easier placement on or within a vehicle.

Returning to FIG. 3, the data store 205 stores the depth model 304 for producing the depth map 308 and the pose model 306 for producing the transformation 310. Both of the models 304 and 306 are, in various embodiments, machine learning algorithms. However, the particular form of either model is generally distinct. That is, for example, the depth model 304 is a machine learning algorithm that accepts an electronic input in the form of a single monocular image and produces the depth map 308 as a result of processing the monocular image. The exact form of the depth model 304 may vary according to implementation but may be conveyed as a convolutional type of neural network.

Figure 4:
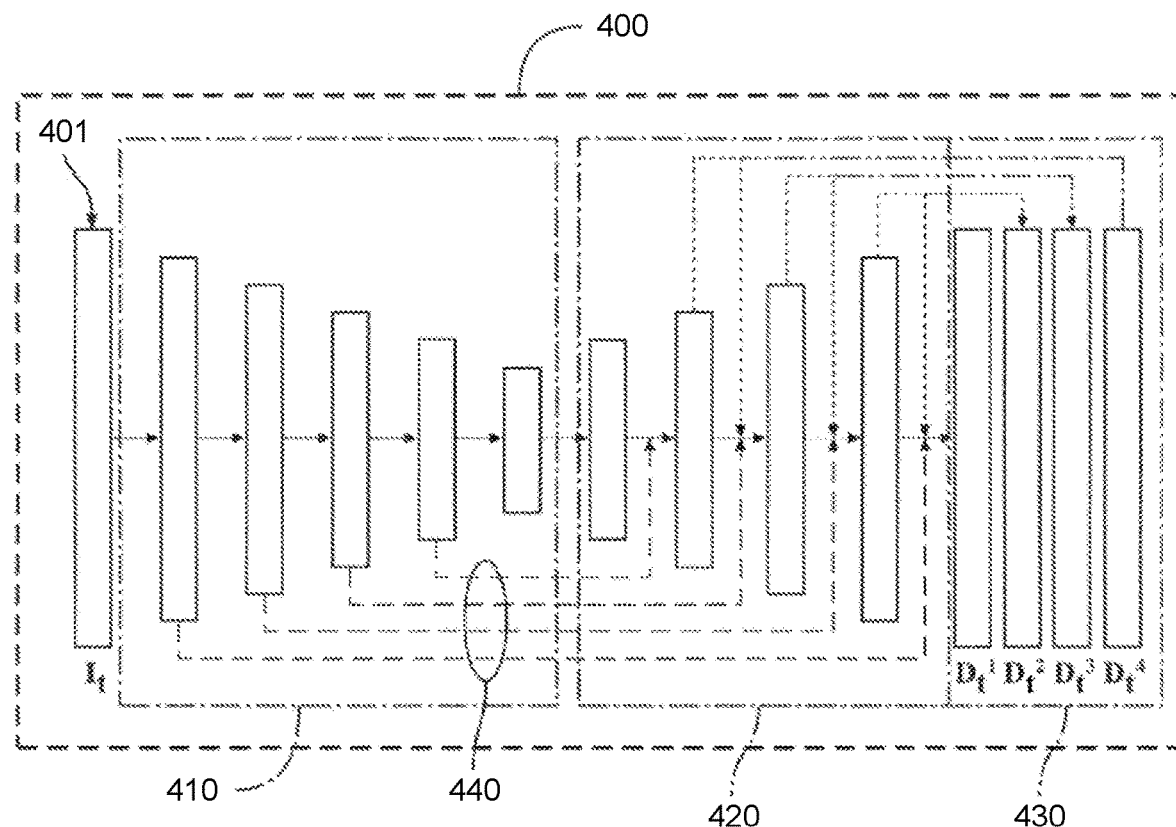
FIG. 4 illustrates a schematic block diagram of an example depth model according to embodiments disclosed herein

FIG. 4 illustrates a schematic block diagram of an example depth model 400 according to embodiments disclosed herein. The depth model 400 is an example implementation of depth model 304 of FIG. 3.

In the example illustrated in FIG. 4, the depth model 400 includes an encoder/decoder architecture. The encoder/decoder architecture may include a set of neural network layers including convolutional components 410 (e.g., 2D and/or 3D convolutional layers 411a-411n forming an encoder) that flow into deconvolutional components 420 (e.g., 2D and/or 3D deconvolutional layers 421a-421n forming a decoder). In one approach, the encoder accepts an image 401 (e.g., a monocular image 248, for example, from the training data 302), as an electronic input and processes the image to extract features therefrom. The features are, in general, aspects of the image that are indicative of spatial information that the image intrinsically encodes. As such, encoding layers that form the encoder function to, for example, fold (i.e., adapt dimensions of the feature map to retain the features) encoded features into separate channels, iteratively reducing spatial dimensions of the image while packing additional channels with information about embedded states of the features. Thus, the addition of the extra channels avoids the lossy nature of the encoding process and facilitates the preservation of more information (e.g., feature details) about the original monocular image.

As illustrated in FIG. 4, the encoder 410 comprises multiple encoding layers formed from a combination of two-dimensional (2D) convolutional layers, packing blocks, and residual blocks. Moreover, the separate encoding layers generate outputs in the form of encoded feature maps (also referred to as tensors), which the encoding layers provide to subsequent layers in the depth model 400. As such, the encoder includes a variety of separate layers that operate on the monocular image, and subsequently on derived/intermediate feature maps that convert the visual information of the monocular image into embedded state information in the form of encoded features of different channels.

The decoder 420 may unfold (e.g., adapt dimensions of the tensor to extract the features) the previously encoded spatial information in order to derive a depth map (e.g., depth map 308) according to learned correlations associated with the encoded features. For example, the decoding layers may function to up-sample, through sub-pixel convolutions and other mechanisms, the previously encoded features into the depth map, which may be provided at different resolutions 430. In some embodiments, the decoding layers comprise unpacking blocks, two-dimensional convolutional layers, and inverse depth layers that function as output layers for different scales of the feature/depth map. The depth map may be a data structure corresponding to the input image that indicates distances/depths to objects/features represented therein. Additionally, in various embodiments, the depth map may be a tensor with separate data values indicating depths for corresponding locations in the image on a per-pixel basis.

The depth model 400 may further include skip connections 440 for providing residual information between the encoder and the decoder to facilitate memory of higher-level features between the separate components. While a particular encoder/decoder architecture is discussed, as previously noted, the depth model 304, in various approaches, may take different forms and generally functions to process the monocular images and provide depth maps that are per-pixel estimates about distances of objects/features depicted in the images.

Figure 5:
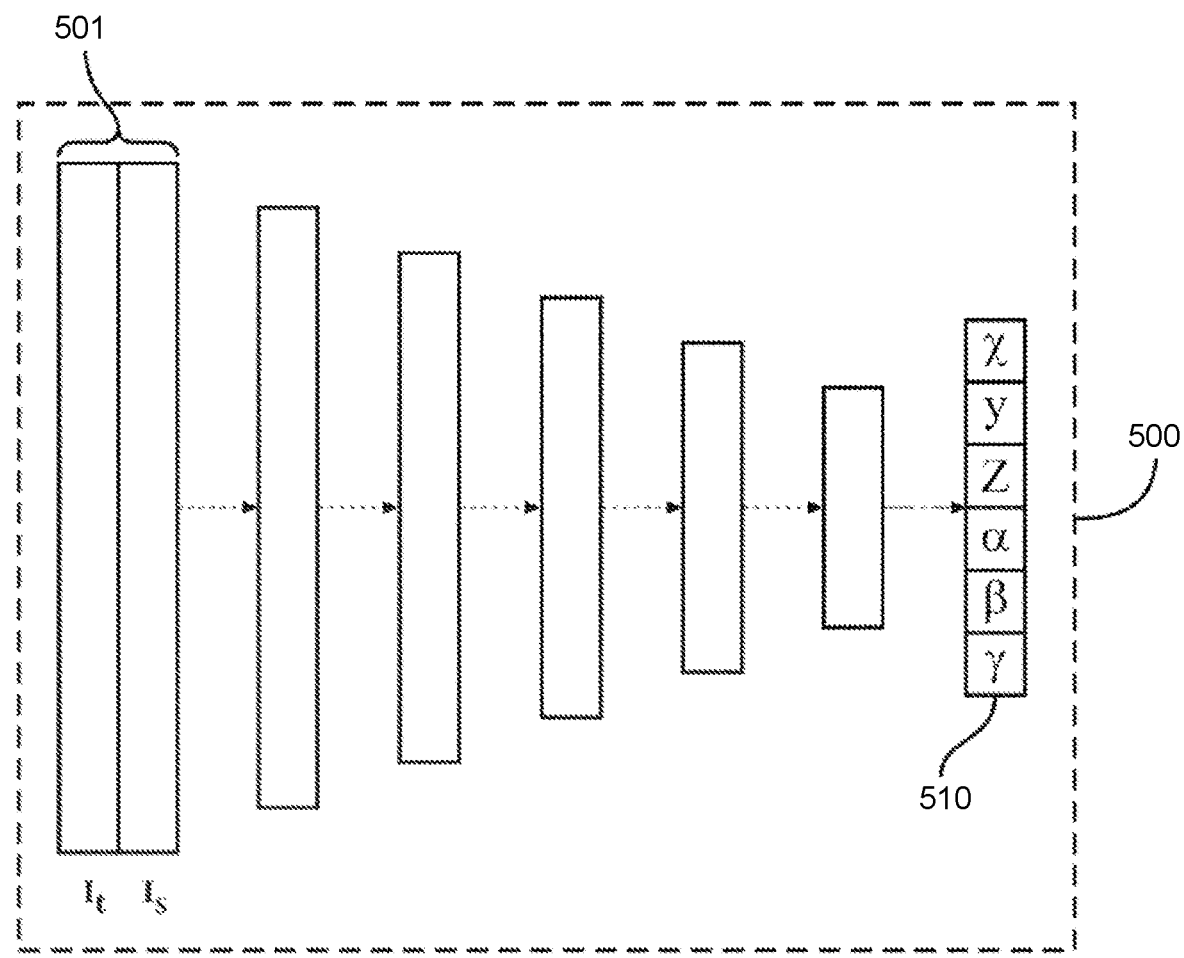
FIG. 5 illustrates a schematic block diagram of an example pose model according to embodiments disclosed herein.

FIG. 5 illustrates a schematic block diagram of an example pose model 500 according to embodiments disclosed herein. The pose model 500 is an example implementation of the pose model 306 of FIG. 3.

In the example of FIG. 5, the pose model 500 accepts two monocular images 501 (e.g., a training pair), for example, from the training data 302 of the same or similar scene as the electronic input (e.g., image processed in the depth model) and processes the monocular images ($I_t$, $I_s$) via layers 505a-505n to produce estimates of image sensor motion in the form of a set of 6 degree-of-freedom (DOF) transformations between the two images. The pose model 500 itself is, for example, a convolutional neural network (CNN) or another learning model that is differentiable and performs dimensional reduction of the input images to produce transformation 510 (e.g., an example of transformation 310). In an example, the pose model 500 may include 7 stride-2 convolutions, a 1×1 convolution with 6*(N−1) output channels corresponding to 3 Euler angles and a 3-D translation for one of the images (source image $I_s$), and global average pooling to aggregate predictions at all spatial locations. The transformation 510 may be, in some embodiments, a 6 DOF rigid-body transformation belonging to the special Euclidean group SE(3) that represents the change in pose between the pair of images provided as inputs to the model 500. In any case, the pose model 500 performs a dimensional reduction of the monocular images to derive the transformation 310 therefrom.

While the depth models 304 and the pose model 306 are shown as discrete units separate from the network module 320, the depth model 304 and the pose model 306 may be integrated with the network module 320. That is, the network module 320 may function to execute various processes of the models 304 and/or 306 and use various data structures of the models 304 and/or 306 in support of such execution. Accordingly, in one embodiment, the network module 320 includes instructions that function to control the processor 206 to generate the depth map 308 using the depth model 304 and generate the transformation 310 using the pose model 306 as disclosed.

Figure 6:
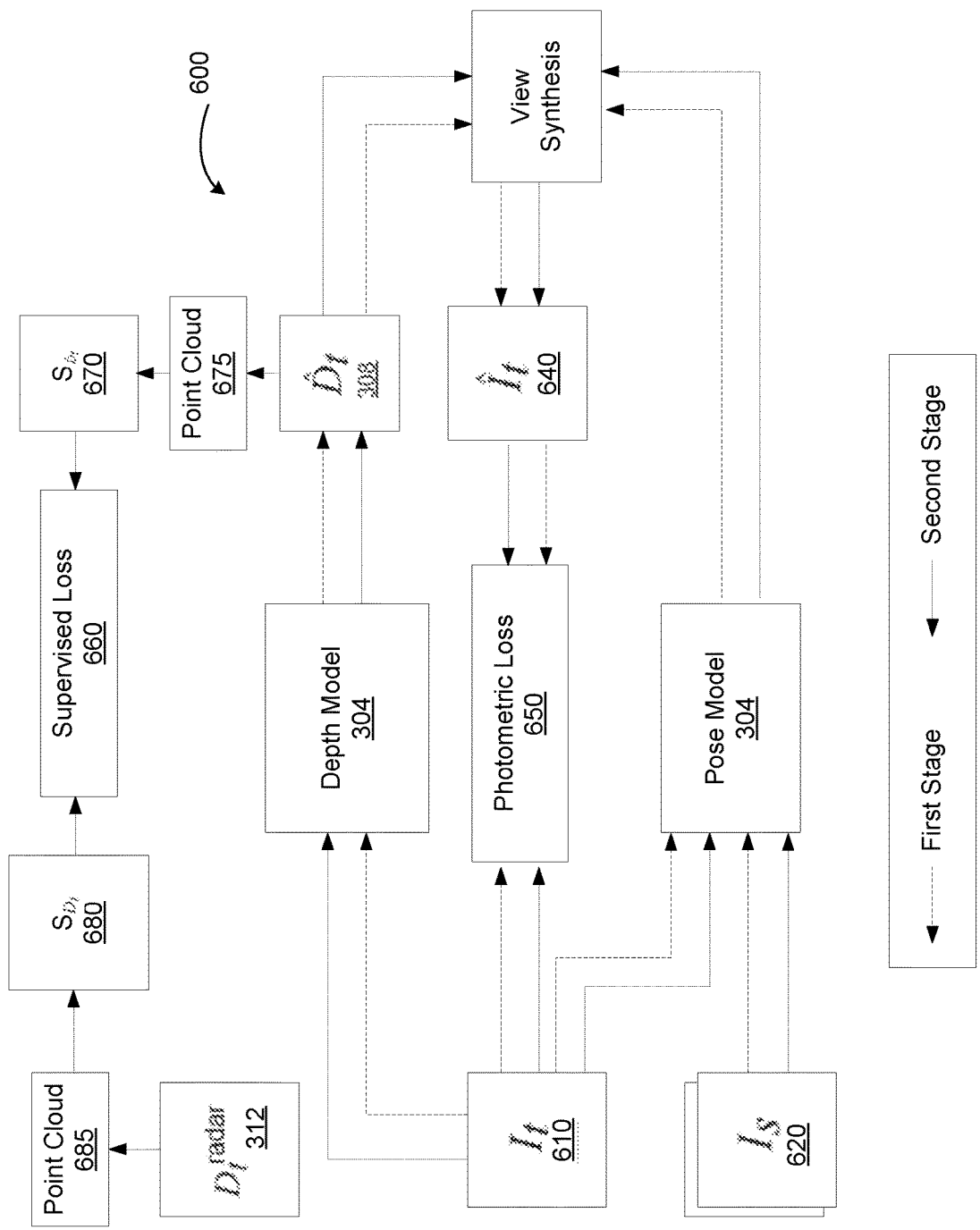
FIG. 6 is a diagram illustrating an example architecture for semi-supervised scale-aware learning of a depth model for monocular depth estimation in accordance with various embodiments.

FIG. 6 is a diagram illustrating an example architecture for semi-supervised scale-aware learning of a depth model for monocular depth estimation. FIG. 6 illustrates an example training architecture formed in relation to the depth model 304 and the pose model 306, as previously described in connection with FIG. 3. FIG. 5 illustrates an example of a training architecture 600 that denotes various relationships between the depth model 304, the pose model 306, and inputs/outputs thereof. The architecture 600 may be implemented using, for example, one or more processors and memory elements such as, for example, processor 206 and memory 208.

As shown in FIG. 6, training data includes a training pair, for example, a first image ($I_t$) 610 and a second image ($I_s$) 620. The training pair may be received, for example, from the training data 302. The training data also includes depth data ($D_t$) 312, for example, from the training data 302.

The training architecture 600 may be executed, for example, by the training module 330, which may include instructions that function to control the processor 206 to execute various actions associated with training the depth model 304 and the pose model 306. For example, the training module 330 may control the training according to a two-stage process, as shown in FIG. 6. The first stage may include a self-supervised training process that involves synthesizing an additional image using the transformation 310 and the depth map 308 produced from the models 304 and 306 operating on the images 610 and 620 in order to generate a self-supervised loss in the form of photometric loss 650. The second stage may include the same self-supervised training as the first stage supplemented with the depth data 312 to produce a supervised loss 660 in addition to the photometric loss 650. Thus, in the first stage and the second stage, the training module 330 may causes the network module 320 to execute the depth model 304 and the pose model 306 on the training data 250, as well as supplement the second stage with the additional supervised loss term 660.

The network module 320 may include instructions that function to control the processor 206 to execute various actions associated with the depth model 304 and the pose model 306. For example, in the first stage, the network module 320 may function to process the first image 610 of a pair of training images according to the depth model 304 to produce the depth map 308 for training. The network module 320, may also use the depth model 304 to generate the depth map 308 for additional purposes, once trained, such as resolving aspects of an environment for hazard avoidance, path planning, and so on (e.g., vehicle systems 220).

The network module 320 may also function to execute the pose model 306 to produce the transformation 310 (not illustrated in FIG. 6), which functions as a basis for synthesizing image ($\hat{I}_t$) 640 from which the training module 330 generates the photometric loss 650 as will be explained further below. Moreover, the network module 320 may execute the models 304 and 306 in concert (e.g., in parallel) for purposes of training, and at the direction of the training module 330. Thus, in addition to executing the model 304, the network module 320 may process the first image 610 and the second image 620 to generate the transformation 310 using the pose model 310. Thus, the network module 320 may operate to execute the models 304 and 306 over the training data 302, while the training module 320 functions to perform the explicit training processes such as generating the loss values and updating the models 304 and 306.

Once the network module 320 executes the models 304 and 306 over the images 610 and 620 to produce the depth map 308 and the transformation 310, the training module 330 generates the synthesized image ($\hat{I}_t$) 640. In various embodiments, the synthesized image 640 is, for example, a synthesized version of the second image 620 according to the depth map 308 and the transformation 310. That is, the process of semi-supervised training of the depth model 308 in the structure-from-motion (SfM) context in the first and second stages involves synthesizing a different image from the first image 610 that is of the same or similar scene from a different pose and/or timestamp of the image sensor. The training module 330 generates the synthesized image 640 using a machine learning algorithm such as a generative neural network (e.g., encoder/decoder architecture, a generative adversarial network (GAN), an autoencoder, etc.), a convolutional neural network (CNN), or another suitable architecture that accepts the depth map 308 and the transformation 310 as input and produces the synthesized image 640 as output.

From the synthesized image 640, the training module 330 can generate the photometric loss 650 and a pose loss (not illustrated). Thus, the training module 330 may formulate the generation of the depth map 308 as a photometric error minimization across the images 610 and 620. The training module 330 can then compare the synthesized image 640 and the original image 610 to determine a monocular loss, for example, the photometric loss 650. This loss characterizes an accuracy of the depth model 304 in producing the depth map 308. Thus, the training module 330 can then use the calculated loss to adjust the depth model 304.

In the second stage, the network module 320 may function to obtain the depth map 308 for training, for example, as generated during the first stage, retrieved from the data store 205, or processing the first image 610 according to the depth model 304. In any case, the training module 330 functions to estimate a single scale 670 for the first image 610 (referred herein as a first scale or image scale) based on the depth map 308. For example, the training module functions to generate a point cloud 675 from the depth map 308. That is, for example, each pixel of the depth map 308 includes X and Y coordinates of the 2D image plane, which can be converted to a 3D point cloud 675 using depth values for each pixel as a Z-coordinate in 3D space. The point cloud 675 may not include points for invalid pixels of the depth map 308, for example, where the depth values are infinite such as a background of the scene.

From this point cloud 675, the training module 330 functions to estimate the first scale 670 for the first image 610. For example, a distance between points in the point cloud 675 may be measured to recover pixel-wise scale between points. Thus, a scale for each point may be recovered from the point cloud In some embodiments, the training module 330 may function to obtain a measure of central tendency across the pixel-wise scales to estimate a single first scale 670 for the first image 610. For example, the training module 330 may calculate an average, median, or mode of the scales for all points as an estimate of the first scale 670 for the first image 610. In this way, a single scale of a monocular image may be obtained based on the depth values from the depth map 308. In some embodiments, assuming scale-factor consistency in the image sensor, the first scale 670 may be indicative of a scale corresponding to any image (e.g., image 248) captured by the image sensor (e.g., image sensor 246).

Additionally, the network function 320 functions to obtain depth data 312 for training, for example, from the data store 205 or directly from a range sensor. The depth data 312 is obtained for the same or similar scene as the target image 610 used to calculate a scale value 680 for the depth data ($D_t$). For example, in various embodiments, depth data is obtained by a range sensor (e.g., radar sensor 242) and generally includes depth measures and distance information from a point in the scene relative to a point of origin (e.g., such as range sensor). In any case, the training module 330 functions to estimate a single scale 680 (referred to herein as a second scale or range sensor scale) based on the depth data 312. The depth data 312 may be obtained as a point cloud, where distance information may be represented in X and Y coordinates and the depth measures represented in Z coordinates. The depth data and thus the point cloud 685 includes only those points for which a depth measure is detected by the range sensor. Thus, the point cloud 685 is sparse or generally incomplete for the scene corresponding to image 610, such that only sparsely distributed points within the scene are include the depth measures. Whereas, the depth map that generally provides comprehensive depths for each separate depicted pixel. Furthermore, the depth measures of the depth data 312 are noisy and thus include a degree of error and uncertainty for each measure.

Accordingly, from the point cloud 685, the training module 330 functions to estimate the second scale 680 for the depth data. For example, a distance between points in the point cloud 685 may be measured with depth measures from the radar to recover a point-wise scale for each point in the point cloud 685. The training module 330 may function to obtain a measure of central tendency across the point-wise scales to estimate a second first scale 680. For example, the training module 330 calculates an average, weighted average, median, or mode of the scales for all points as an estimate of the single second scale 680. In one example, a weighted average or median of the point-wise scales of the depth data 312 may be used. For example, a weight may be applied to each scale based on the degree of uncertainty/ error in the scales for each pixel and an average taken of the weighted scales (e.g., weights determined by normalizing the uncertainty according to the lowest uncertainty within the depth data 312). In this way, a single scale for the depth data 312 may be obtained based on the depth measures, which smooths out errors in the depth data and is, therefore, more robust than a pixel-wise application of scales. In some embodiments, assuming scale-factor consistency in the radar sensor, the second scale 680 may be indicative of a scale corresponding to any depth data generated by the range sensor (e.g., radar sensor 242).

In some embodiments, once the first and second scales 670 and 680 are determined, the training module 330 functions to generate the supervised loss 660. For example, the supervised loss 660 can be generated from a comparison of the first scale 670 with the second scale 680. For example, the second scale 670 may be divided by the first scale 670 to generate a supervised loss 660. The supervised loss 660 (e.g., the single scale factor) can be used to align the depth model 304 with the second scale 680 associated with the range sensor (e.g., radar sensor 242). Thus, the training module 330 may use a single scale for the depth data 312 to collapse the scale ambiguity in the target image 610 into a metrically accurate scale factor for use in the depth model 304; thereby, providing for a scale-aware depth model for monocular depth estimation.

In another example, the supervised loss 660 may be obtained by dividing the point-wise depth data from point cloud 680 with the pixel-wise distance between points of point cloud 675. For example, for each valid pixel, the depth values from the depth map 308 may be divided by the depth data ($D_t$). This pixel-wise comparison provides the conversion from the unknown scale of the target image 610 to the metric scale. The metric scale is maintained using a measure of central tendency, such as a weighted average for the entire dataset. Then, as described above, the supervised loss 660 can be used to align the depth model 304 with metrically accurate scale based on the depth data from range sensor (e.g., radar sensor 242). Thus, the training module 330 may use a single scale for the depth data 312 to collapse the scale ambiguity in the target image 610 into a metrically accurate scale factor for use in the depth model 304; thereby, providing for a scale-aware depth model for monocular depth estimation.

The supervised loss 660 may be used to pay a loss between radar sensor scale and image scale, penalizing this distance. The supervised loss can then be used in addition to the photometric loss 650, and eventually the supervised loss will be minimized, meaning that the depth data point cloud and image point cloud will have the same scale.

In some embodiments, the training module 322 may function to determine whether or not the errors/uncertainty in the depth data 312 is above a set threshold uncertainty. Thresholds may be manually set empirically, or using a percentage (e.g., the 50% highest errors in the image are discarded, regardless of the value). For example, the training module 322 may determine a measure of central tendency of the uncertainty in the depth data and compare this to a threshold uncertainty. In another example, the training module 322 identify a number of points in the depth data 312 having uncertainty above the threshold uncertainty and, if that number is greater than a set threshold number, determine that the error/uncertainty in the depth data 322 is to high. Where the training module determines the degree of error/uncertainty is above the threshold, a single scale factor (e.g., supervised loss 660) is determined from a plurality of readings by the range sensor (e.g., where each reading corresponds to a point cloud such as point cloud 680 above). The plurality of readings may be part of a dataset, for example, stored in data store 205. For each reading, a second scale 680 is separately determined as set forth above to generate a plurality of second scales. A measure of central tendency is than taken of the plurality of second scales (e.g., an average, median, mode, etc.) to determine a single aggregate second scale for the depth data. In one embodiment, the supervised loss 660 may be determined as set forth above, except that the single aggregate second scale is used in place of a single second scale.

In another embodiment, the training module 322 may generate an aggregate first scale from the dataset. For example, the dataset may include the plurality of readings from the range sensor and a plurality of images corresponding to the scenes of the plurality of readings. In this case, for each image, a first scale 670 is separately determined as set forth above to generate a plurality of first scales. A measure of central tendency is than taken of the plurality of first scales (e.g., an average, median, mode, etc.) to determine a single aggregate first scale for the images. The supervised loss 660 may then be determined as set forth above, except that the single aggregate first scale and single aggregate second scale are used in place of a first and second scales.

In yet another example, a single scale factor may be determined for each training data pair in the data set (e.g., each reading and corresponding image). The training module 330 may then determine a measure of central tendency for the scale factors across the dataset, thereby generating a single aggregate scale factor for the dataset.

As an example, with reference to self-supervised loss context for SfM, the training module 330 may be configured with (i) a monocular depth model $f_D$: I→D (e.g., depth model 304) that predicts a scale-ambiguous depth $\hat{D}=f_D(I(p))$ for every pixel p in the target image $I_t$; and (ii) a monocular motion estimator $f_X:(I_t, I_s)$ (e.g., pose model 306), that predicts a set of 6-DoF rigid-body transformations for all s E S given by $$x_{t \to s} = \begin{pmatrix} R & r \\ 0 & 1 \end{pmatrix} \in SE \quad \text{Eq. 1}$$

between the target image $I_t$ and the set of source images $I_s \in I_S$ considered as part of a temporal context. Additionally, the training module 330 may use the depth data from the training data 302 to (i) collapse the scale ambiguity of a monocular image sensor configuration into a metrically accurate version of the depth model 304, and (ii) improve the depth model 304 and the pose model 306 by leveraging cues from the depth data that are not appearance-based.

The training module 330 may implement the training of the depth model 304 according to two components. The two components include a self-supervised term (e.g., photometric loss 650) that operates on appearance matching $L_p$ between the target image $I_t$ (e.g., image 610) and the synthesized image $I_{s \to t}$ (also annotated as $\hat{I}_t$ 640) from the context set $S=\{I_S\}_s=1^S$, with masking $M_s$ and depth smoothness $L_{smooth}$, and a supervised loss value that operates on a comparison between the predicted depth map 308 and the depth data 312 from the training data 250.

$$L_{(I_t,\hat{I}_t)} = L \odot M_p + \lambda_1 L_{smooth} + \Delta_1 L_{supervised} \quad \text{Eq. (2)}$$

Where Mp is a binary mask that avoids computing the photometric loss on the pixels that do not have a valid mapping (e.g., pixels from the separate images that do not project onto the target image given the estimated depth), $\lambda_1$ and $\lambda_2$ represent weights for adjusting the loss terms in Eq(2). $L_p$ represents appearance matching loss and is implemented according to, a pixel-level similarity between the target image $I_t$ (e.g., image 610) and the synthesized image $\hat{I}_t$ (e.g., image 640) using a structural similarity (SSIM) term combined with an L1 pixel-wise loss term inducing an overall photometric loss as shown in:

$$L_p(I_t, \hat{I}_t) = \alpha \frac{1 - SSIM(I_t, \hat{I}_t)}{2} + (1-\alpha)\|I_t - \hat{I}_t\| \quad \text{Eq. (3)}$$

While multi-view projective geometry provides strong cues for self-supervision, errors due to parallax and out-of-bounds objects have an undesirable effect incurred on the photometric loss that can include added noise to the training. Accordingly, the training module 230 can mitigate these effects by calculating the minimum photometric loss per pixel for the source image according to:

$$L_p(I_t, S) = \min_{s \in S} L_p(I_t, I_{s \to t}) \quad \text{Eq. (4)}$$

The intuition involves the same pixel not occluding or be out-of-bounds in all context images, and that the association with minimal photometric loss should be the correct. Additionally, as shown below, the training module 330 masks out static pixels by removing pixels that have a warped photometric loss higher than a corresponding unwarped photometric loss, which the training module 330 calculates using the original source image (e.g., 620) without synthesizing the target. The mask (Mp) removes pixels that have appearance loss that does not change between frames, which includes static scenes and dynamic objects moving at a similar speed as the image sensor.

$$M_p = \min_{s \in S} L_p(I_t, I_s) > \min_{s \in S} L_p(I_t, I_{s \to t}) \quad \text{Eq. (5)}$$

$L_{smooth}$ represents depth smoothness loss and is implemented to regularize the depth in textureless low-image gradient regions, as shown in equation (5) below. The smoothness loss is an edge-aware term that is weighted for separate pyramid levels starting from 1 and decaying by a factor of two for the separate scales.

$$L_{smooth}(\hat{D}_t) = |\delta_x \hat{D}_t| e^{-|\delta_x I_t|} + |\delta_y \hat{D}_t| e^{-|\delta_y I_t|} \quad \text{Eq. (6)}$$

Thus, the training module 330 calculates the appearance-based loss according to the above to include the photometric loss, the mask, and the depth smoothness terms for the self-supervised first stage. Through this first training stage, the model 304 develops a learned prior of the monocular images as embodied by the internal parameters of the model 304 from the training on the image pairs in the training data 250. In general, the model 304 develops the learned understanding about how depth relates to various aspects of an image according to, for example, size, perspective, and so on. However, after the first stage of training, the depth model 304 still lacks awareness of a metrically accurate scale.

Consequently, the training module 330 controls the network module 320 to execute the second stage that is a supervised training process in combination with the self-supervised process as previously described. Thus, the training module 330 further employs the second stage loss (e.g., supervised loss 660) to refine the depth model 304. To generate the second stage loss, the training module 330 generates a scale factor as the supervised loss 660 by taking a central tendency of a scales from the depth map 308 of the target image $I_t$ and a central tendency of scales from depth data 312. That is, for example, pixel-wise scales are calculated from a point cloud of the depth map 304 and the central tendency of the pixel-wise scales is determined. For example, the training module 330 takes an average, median, or mode of the pixel-wise scales to determine a single first scale. Additionally, point-wise scales are determined from the point cloud of the depth data 312 and the central tendency of the point-wise scales is determined. For example, the point-wise scale value annotated to each valid point the depth data 312 is weighed based on the uncertainty of each depth measurement and then an average may be calculated from the weighted scale values. Thus, the supervised loss 660 is then calculated by taking the ratio of the second scale of the depth data 312 to the first scale of the depth map 308.

The training module 330 imposes the supervised loss 660 to further refine the depth model 304. The additional supervised loss ($L_{supervised}$) allows the depth model 304 to learn metrically accurate estimates resulting in the depth model 304 improving predictions. By generating representative losses across the depth data 312, uncertainty due to noise and sparsity in depth data may be smoothed and reduced. Thereby, providing an reasonable estimate of the scale in the depth data 312, which can be used to align the scale in a target image with the scale in the depth data. In this way, the semi-supervised learning circuit 210 improves the understanding of the depth model 304 while avoiding a need for denser and more costly annotated depth data to provide scale-aware depth estimates.

The training module 330 may then train the depth model 304 and the pose model 306 together in an iterative manner over the training data 302 that includes a plurality of monocular images from video and a plurality of monocular video images with corresponding depth data. Through the process of training the model 304, the training module 330 adjusts various hyper-parameters in the model 304 to fine-tune the functional blocks included therein. Through this training process, the model 304 develops a learned prior of the monocular images as embodied by the internal parameters of the model 304. In general, the model 304 develops the learned understanding about how depth relates to various aspects of an image according to, for example, size, perspective, and so on. Consequently, the network module 320 can provide the resulting trained depth model 304 in the semi-supervised learning circuit 210 to estimate depths from monocular images that do not include an explicit modality identifying the depths. In further aspects, the network module 320 may provide the depth model 304 to other systems that are remote from the semi-supervised learning circuit 210 once trained to perform similar tasks. In this way, the semi-supervised learning circuit 210 functions to improve the accuracy of the depth model 304 while using minimal annotated data in a supervising refinement stage of training as opposed to relying on comprehensive training data sets that include extensively annotated data.

In some embodiments, the supervised loss may be aggregated over an entire dataset (e.g., the plurality of target images and corresponding range sensor reading). The supervised loss in this manner may be used to refine the depth model 304 and allows the depth model 304 to learn metrically accurate estimates; thereby, resulting in the depth model 304 and improving predictions. For example, a supervised loss 660 (e.g., scale factor) can be calculated as set forth above for each target image and range senor reading pair, thereby generate a plurality of first scales. An aggregate of the supervised losses can be generated by taking an measure of central tendency of all supervised losses 660 calculated for the entire dataset, thereby providing a single supervised loss that can be used to train the depth model 304. As another example, a first scale 670 may be calculated for each target image and a second scale 680 may be calculated for each reading corresponding to each target image, as set forth above. A measure of central tendency of the first scales, second scales, or both may be taken across the entire dataset, for example, by averaging the first scales 670 (referred to herein as aggregate first scale) and/or averaging the second scales 680 (referred to herein as aggregate second scales). Then, similar to the operations set forth above, a ratio of the aggregate depth data loss to the aggregate photometric loss provides the supervised loss 660.

While embodiments herein are provided where the depth data is radar data, as set forth above, the depth data may be from any other suitable range sensor. For example, point clouds generated by LiDAR sensors maybe used as depth data.

Figure 7:
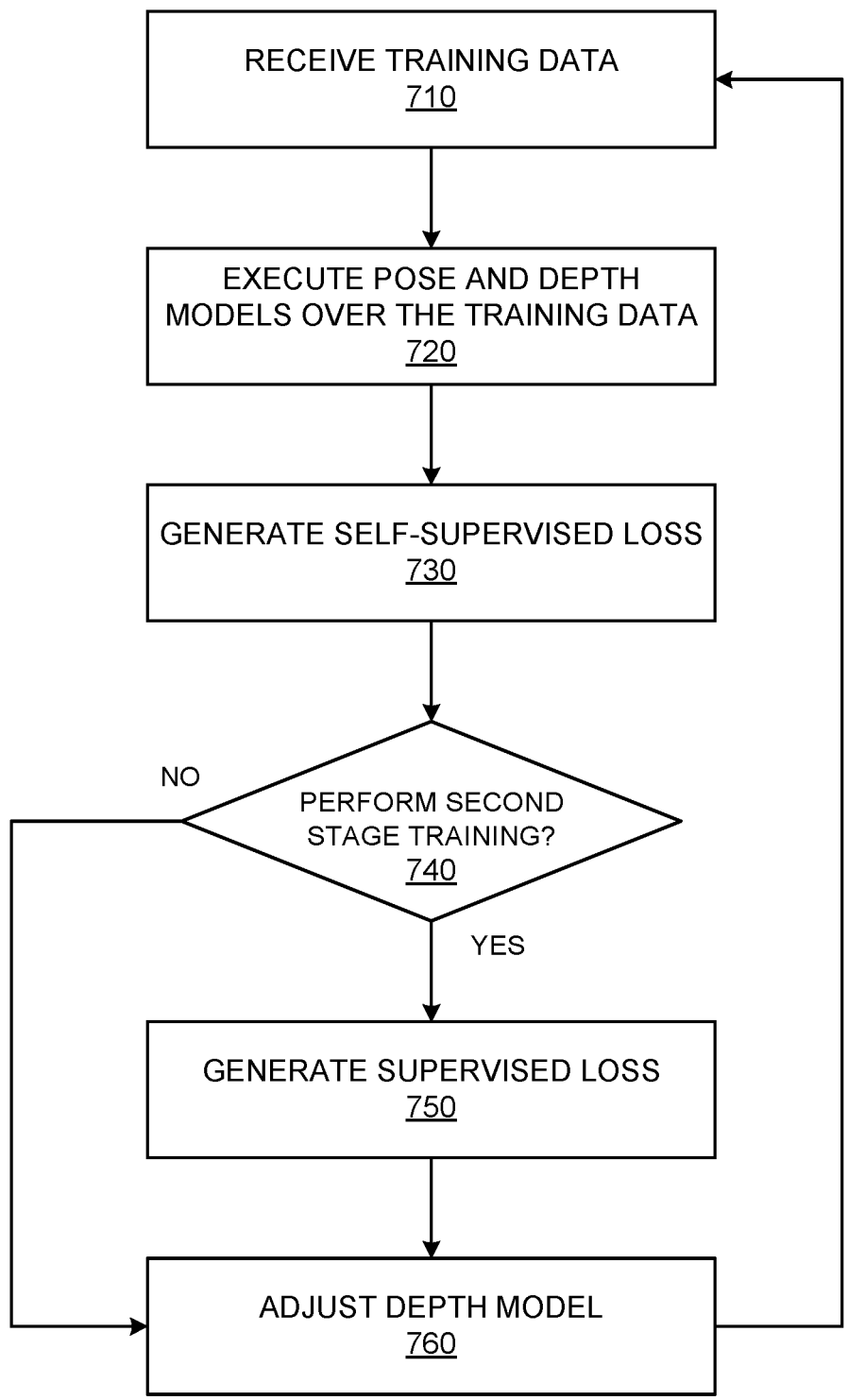
FIG. 7 is an operational flow diagram illustrating an example process for semi-supervised scale-aware learning of a depth model for monocular depth estimation in accordance with various embodiments.

FIG. 7 is an operational flow diagram illustrating an example process for semi-supervised scale-aware learning of a depth model for monocular depth estimation in accordance with various embodiments. FIG. 7 illustrates a process 700 that may be implemented as instructions, for example, stored on memory 208, that when executed by one or more processors 206 to perform the operations of process 700.

In some embodiments, training the depth model 304 according to the first stage that is self-supervised may be represented as blocks 710, 720, 730, and 760. The second stage that is supervised may be represented at blocks 710, 720, 730, 740, 750, and 760. Thus, the second stage may encompasses the first stage in addition to further aspects corresponding with blocks 740 and 750. Thus, training according to the separate stages will generally be described according to method 700 overall. However, it should be appreciated that training according to the separate stages generally may occur independently and over multiple iterations with the first stage executing over a plurality of iterations prior to training according to the second stage over a plurality of separate iterations occurring after the first stage. Once the depth model 304 is trained overall according to both stages, the depth model 304 provides a metrically accurate mechanism for inferring depths from monocular images, which the network module 320 may then provide to another device or use within the existing device to perceive information about an environment, for example, the vehicle 10.

At block 710, training data is received including a pair of monocular training images. In the case of the second stage, the training data also includes depth data. The training data may be, for example, training data 302 of FIG. 3. According to various embodiments, the training module 330 acquires training images locally from co-located systems with the semi-supervised learning circuit 210 (e.g., image sensor 246) in an active manner along with the depth data (e.g., distance measuring sensors such as radar 242). In further embodiments, the training module 330 may acquire the training images and depth data through a communication link with a remote system or from a repository of such information as included in the data store 205. Thus, while the semi-supervised learning circuit 210 can be implemented within a particular device that is, for example, actively navigating through an environment (e.g., vehicle 10), the semi-supervised learning circuit 210 may also function as a cloud-based computing service to train the depth model 304 and/or to analyze monocular images for depth information, and thus may receive the training data 250 from separate sources.

Block 710 may also include receiving depth data associated with the monocular video in order to facilitate the supervised training stage. That is, whether the depth data is embedded with the monocular training images or is provided separately, the training data 302 includes the depth data for, in one approach, at least a subset of the image from the video. As previously mentioned, the depth data is noisy depth data (e.g., derived from a radar sensor 242) that correlates with the video from image sensor 246. Thus, the image sensor 246 and a radar sensor 242 may be generally calibrated together in order to correlate the depth data with the images (e.g., for example based on timestamps or other association of data).

At block 720, the depth model and the pose model are executed on the pair of training images received at block 710. For example, the training module 230 causes the network module 220 to execute the depth model 304 and the pose model 306 on the training images from training data 205. In some embodiments, the network module 320 executes the depth model 304 to process a first image of a training pair to generate the depth map 308. Execution of the depth model 304 to produce the depth map 308 at block 620 may be a routine execution of the depth model 304. For example, there is minimal variation in the way in which the model 304 is executed during training since the overall goal is to have the model 304 produce the depth map 308 according to learned weights and as would occur in normal operating conditions so that the training module 330 can subsequently assess the performance of the model 304 according to the loss functions.

Also at block 720, the pose model 306 may be executed to process the first image and a second image of the training pair to generate the transformation 310. The execution of the pose model 306 is generally routine occurs under normal operating conditions. Although the pose model 306 may be used in various circumstances for generating transformations, the semi-supervised learning circuit 210 may use the pose model 306 for the application of training the depth model 304. Thus, when implemented as part of process 700, the pose model 306 may reside in an idle state when not training the depth model 304. Models 304 and 306 may be executed in parallel during training to generate the depth map 308 and the transformation 310. That is, the pose model 306 may function to facilitate the self-supervised structure from motion (SfM) training by providing the transformation 310 from which the training module 330 may assess the performance of the depth model 304. The training module 330 may also train the pose model 306, which may be done in combination with the depth model 304. Execution of the depth model 304 and the pose model 306 for the first and the second stage generally may occur in the same manner for both stages. However, in the second stage at least the first image further includes the corresponding depth data for subsequent use in generating the second stage loss values as discussed below.

At block 730, self-supervised loss(es) (e.g., photometric loss, depth smoothness loss, etc.) are calculated as either independent losses for the first stage or as one component of a second stage loss. For example, the training module 230 may compute the self-supervised loss(s), as described above in connection with FIG. 6. In some embodiments, the training module 330 may initially calculate the self-supervised loss according to a comparison between a synthetic image and the target image (i.e., the first image of the pair) according to the photometric loss function, which may include an appearance loss, a regularization/depth smoothness loss, and/or other components that are appearance-based.

At block 740, a determination is made whether the current training stage is the second. If the determination is no, process 700 proceeds to block 760 for adjusting the depth model 304. Otherwise, process 700 proceeds to block 750 for generating the additional second-stage supervised loss, for example, as described above in connection with FIG. 6. As previously noted, the first stage of training is a self-supervised structure from motion (SfM) training process that accounts for motion of an image sensor between the training images of a pair to cause the depth model to learn how to infer depths without using annotated training data (e.g., without the depth data). However, because the resulting depth model 304 from solely training on the self-supervised process does not accurately understand scale (e.g., is scale ambiguous), the training module 330 further imposes the second stage to refine the depth model 304. That is, during the second stage, the training module 330 trains the depth model 304 to refine the model 304 using a single scale factor derived from depth data that includes annotations about depth in the individual images. As previously noted, the depth data may represent dispersed ground truths providing limited supervision over depth estimates of the individual images.

At block 760, the depth model 304 is updated according to the loss values (e.g., first stage or first/second stage) as determined in blocks 730 and/or 750. For example, the training module 330 updates the depth model 304 using the loss values to adapt weights in the model 304. Therefore, the disclosed two-stage semi-supervised training approach improves the understanding of the depth model 304 while using primarily self-supervised training that is supplemented with the additional refinement stage that uses a minimal set of sparsely annotated depth data. In this way, the embodiments herein improve the depth model 304 to produce improved depth estimates that translate into improved situational awareness of the implementing device (e.g., the vehicle 10), and improved abilities to navigate and perform other functions therefrom.

Figure 8:
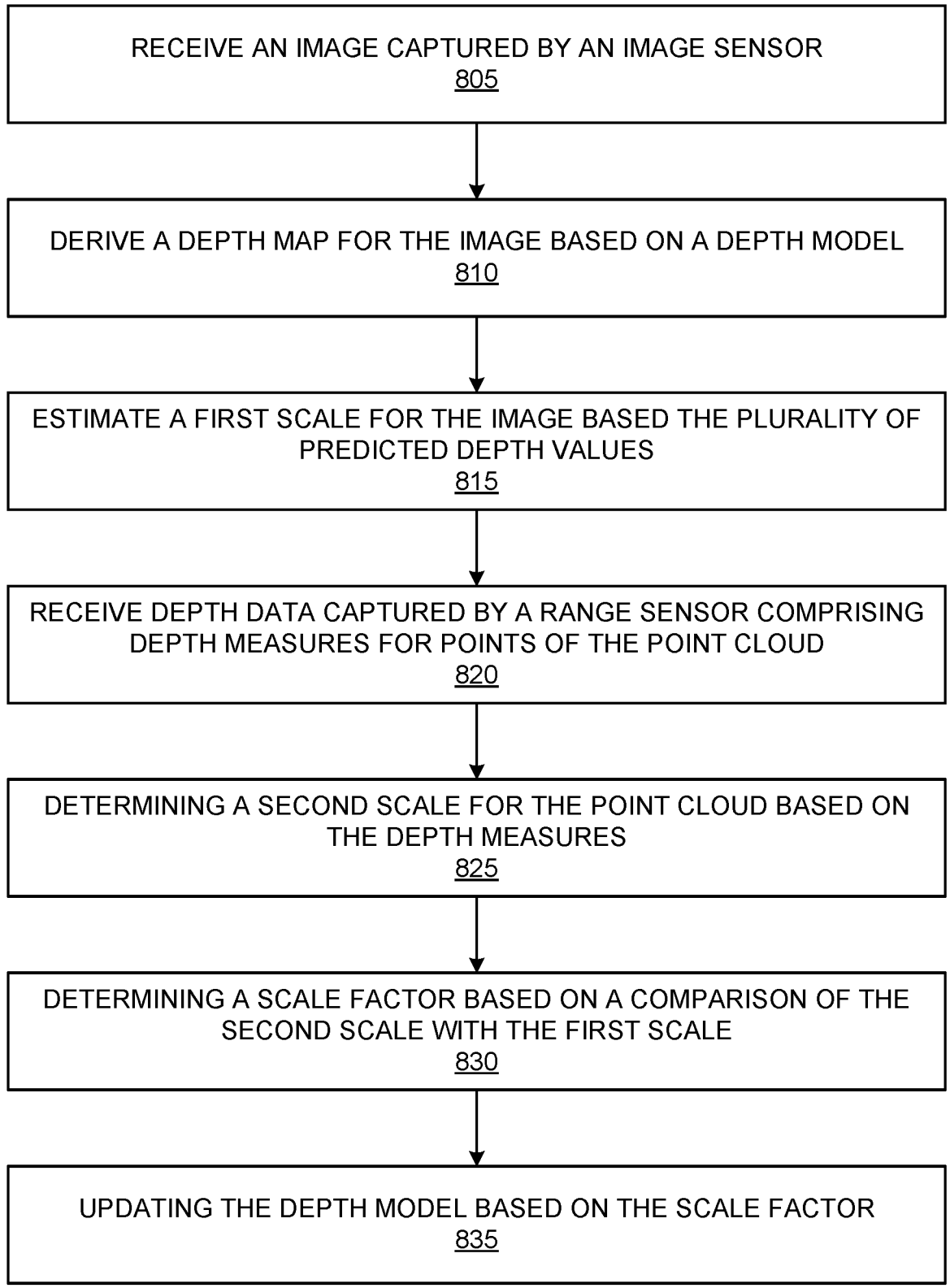
FIG. 8 is a flow chart illustrating example operations for implementing semi-supervised scale-aware learning of a depth model for monocular depth estimation in accordance with various embodiments.

FIG. 8 is a flow chart illustrating example operations for implementing semi-supervised scale-aware learning of a depth model for monocular depth estimation in accordance with various embodiments. In this example, the process may be performed by various devices described herein, including the system 200 of FIG. 2, cloud-based servers, physical or dedicated server, software-as-a-service (SaaS), distributed computing service, etc.

At block 805, the process may receive an image captured by an image sensor, the image comprising pixels representing a scene of an environment. For example, the image may be a monocular image captured by a monocular camera.

At block 810, the process may derive a depth map for the image based on a depth model. The depth map may include predicted depth values for a plurality of the pixels of the image.

At block 815, the process may estimate a first scale for the image based the plurality of predicted depth values. For example, a point cloud may be generated from the depth map based on the predicted values and the first scale estimated from the point cloud. The first scale may be determined by a measure of central tendency of the predicted depth values. The first scale is a single scale for the image, and may be indicative of a scale associated with the image sensor used to capture the image.

At block 820, the process receive depth data captured by a range sensor. The depth data may include a point cloud representing the scene of the environment, where the point cloud includes depth measures for a plurality of points of the point cloud. For example, the range sensor may be a radar sensor that provides a sparse point cloud.

At block 825, the process may determine a second scale for the point cloud based on the depth measures from block 820. The second scale may be determined by a measure of central tendency of the depth measures for each point of the point, for example, a weighted average with weights being based on errors associated with each point of the point cloud. The second scale is a single scale for the range sensor, and be indicative of a scale associated with the range sensor used to generate the depth data.

At block 830, the process may determine a scale factor based on a comparison of the second scale with the first scale. For example, a scale factor may be determined by dividing the second scale factor by the first scale factor. The scale factor may be a single scale factor providing for scale consistency in the depth model.

At block 835, the process may update the depth model based on the scale factor, such that the depth model generates metrically accurate depth estimates based on the scale factor from block 830.

Figure 9:
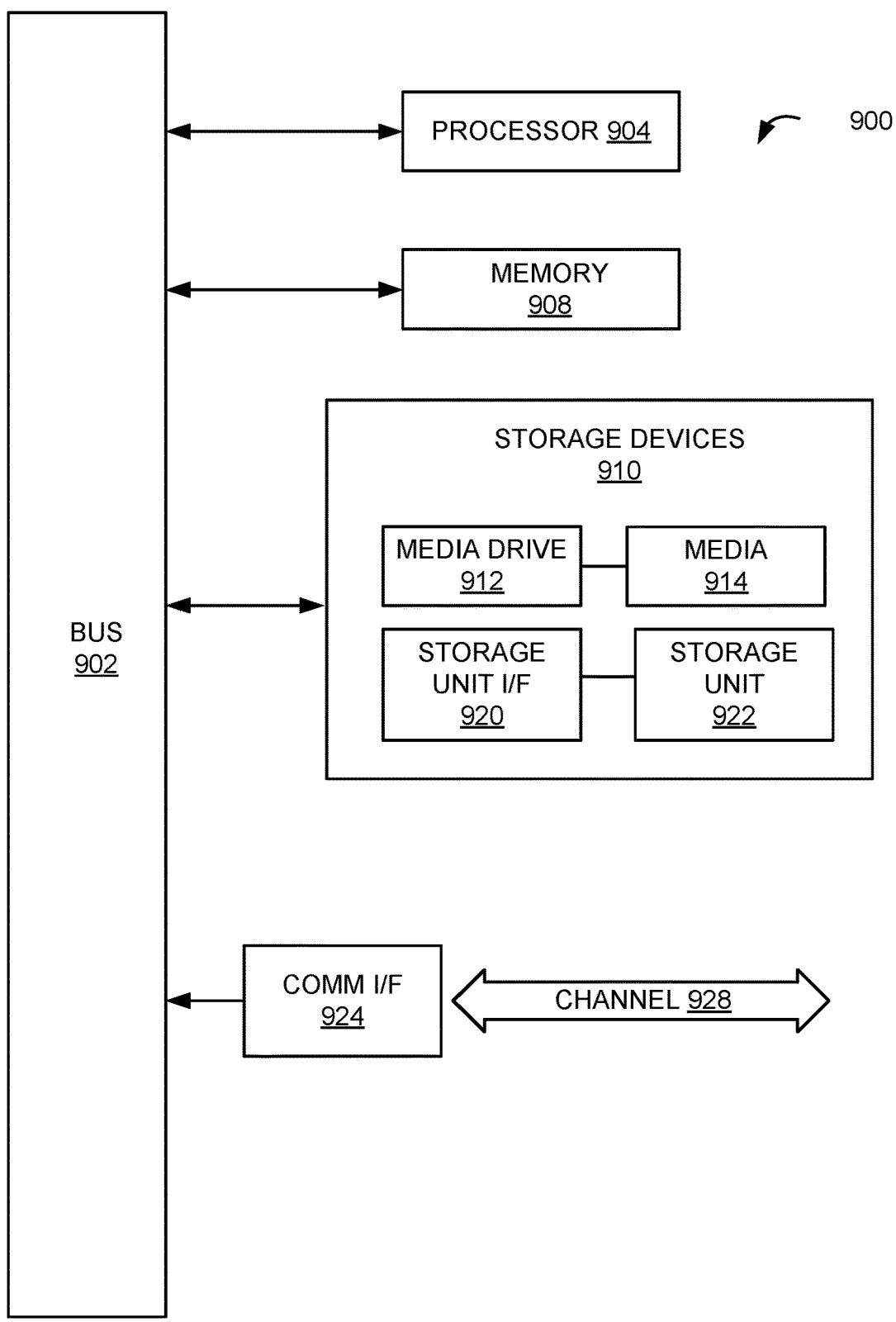
FIG. 9 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 9. Various embodiments are described in terms of this example-computing component 900. After reading this description, it will become apparent to a person skilled in the relevant art how to implement the application using other computing components or architectures.

Referring now to FIG. 9, computing component 900 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 900 might also represent computing capabilities embedded within or otherwise available to a given device. For example, a computing component might be found in other electronic devices such as, for example, portable computing devices, and other electronic devices that might include some form of processing capability.

Computing component 900 might include, for example, one or more processors, controllers, control components, or other processing devices. This can include a processor, and/or any one or more of the components making up user vehicle 10, semi-supervised scale-aware learning system 200, and cloud. Processor 904 might be implemented using a general-purpose or special-purpose processing engine such as, for example, a microprocessor, controller, or other control logic. Processor 904 may be connected to a bus 902. However, any communication medium can be used to facilitate interaction with other components of computing component 900 or to communicate externally.

Computing component 900 might also include one or more memory components, simply referred to herein as main memory 908. For example, random access memory (RAM) or other dynamic memory, might be used for storing information and instructions to be executed by processor 904. Main memory 908 might also be used for storing temporary variables or other intermediate information during execution of instructions to be executed by processor 904. Computing component 900 might likewise include a read only memory ("ROM") or other static storage device coupled to bus 902 for storing static information and instructions for processor 904.

The computing component 900 might also include one or more various forms of information storage mechanism 910, which might include, for example, a media drive 912 and a storage unit interface 920. The media drive 912 might include a drive or other mechanism to support fixed or removable storage media 914. For example, a hard disk drive, a solid-state drive, a magnetic tape drive, an optical drive, a compact disc (CD) or digital video disc (DVD) drive (R or RW), or other removable or fixed media drive might be provided. Storage media 914 might include, for example, a hard disk, an integrated circuit assembly, magnetic tape, cartridge, optical disk, a CD or DVD. Storage media 914 may be any other fixed or removable medium that is read by, written to or accessed by media drive 912. As these examples illustrate, the storage media 914 can include a computer usable storage medium having stored therein computer software or data.

In alternative embodiments, information storage mechanism 910 might include other similar instrumentalities for allowing computer programs or other instructions or data to be loaded into computing component 900. Such instrumentalities might include, for example, a fixed or removable storage unit 922 and an interface 920. Examples of such storage units 922 and interfaces 920 can include a program cartridge and cartridge interface, a removable memory (for example, a flash memory or other removable memory component) and memory slot. Other examples may include a PCMCIA slot and card, and other fixed or removable storage units 922 and interfaces 920 that allow software and data to be transferred from storage unit 922 to computing component 900.

Computing component 900 might also include a communications interface 924. Communications interface 924 might be used to allow software and data to be transferred between computing component 900 and external devices. Examples of communications interface 924 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 924 may be carried on signals, which can be electronic, electromagnetic (which includes optical) or other signals capable of being exchanged by a given communications interface 924. These signals might be provided to communications interface 924 via a channel 928. Channel 928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 908, storage unit 920, media 914, and channel 928. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 900 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for depth estimation from monocular images, comprising:
   receiving an image captured by an image sensor, the image comprising pixels representing a scene of an environment;
   deriving a depth map for the image based on a depth model, the depth map comprising a plurality of predicted depth values for a plurality of the pixels of the image;
   estimating a first scale comprising a pixel distance between depth values for the image based the plurality of predicted depth values;
   receiving depth data captured by a range sensor, the depth data comprising a point cloud representing the scene of the environment, the point cloud comprising depth measures for a plurality of points of the point cloud;
   determining a second scale comprising a measure of central tendency for the first scale based on the depth measures, wherein the measure of central tendency, for the first scale, comprises a measure of a central value for probability distribution of the first scale based on the depth measure;
   determining a scale factor based on a ratio between the second scale and the first scale; and
   updating the depth model based on the scale factor, wherein the depth model generates metrically accurate depth estimates based on the scale factor.

2. The method of claim 1, wherein the image is a monocular image.

3. The method of claim 1 wherein the range sensor produces a sparse point cloud, wherein the depth measure for each point comprises an error.

4. The method of claim 3, wherein the range sensor is a radar sensor.

5. The method of claim 1, further comprising:
   generating a point cloud from the derived depth map, the point cloud comprises points based on the depth values for the plurality of pixels,
   wherein the estimated first scale is based on the point cloud of the derived depth map.

6. The method of claim 1, wherein the first scale is a single first scale for the image.

7. The method of claim 6, further comprising:
   determining a pixel-wise scale for each of the plurality of the pixels of the image based on a depth value of each respective pixel; and
   determining a measure of central tendency of the pixel-wise scales, wherein the first scale is estimated based on the determined measure of central tendency, wherein the central tendency indicates an arithmetic average for probability distribution.

8. The method of claim 1, wherein the second scale is a single second scale for the depth data.

9. The method of claim 8, further comprising:
determining a point-wise scale for each of the plurality of the points of the point cloud based on a depth measure of each respective point; and
determining a measure of central tendency of the point-wise scales, wherein the second scale is estimated based on the determined measure of central tendency, wherein the central tendency indicates a weighted average for probability distribution.

10. The method of claim 1, wherein the depth measure for each point comprises an error, the method further comprising:
determining that the error is greater than a threshold; and
in response to the determination that the error is greater than the threshold,
determining a plurality of scale factors for a plurality of images captured by the image sensor and a plurality of depth data captured by a radar sensor; and
determining an aggregate scale factor by aggregating the plurality of scale factors, wherein updating the depth model is based on the aggregate scale factor.

11. A system with a method, comprising:
a memory; and one or more processors that are configured to execute machine readable instructions stored in the memory for performing a method comprising:
training a depth model at a first stage according to self-supervised photometric losses generated from at least a first monocular image;
determining a single scale factor comprising a ratio between a pixel distance between depth values from a depth map of the first monocular image and a measure of central tendency based on the pixel distance from a sparse point cloud generated by a range sensor, wherein the measure of central tendency comprises of a measure of a central value for probability distribution across pixel-wise scales; and
training the depth model at a second stage according to a supervised loss based on the single scale factor,
wherein the depth model trained according to the second stage generates metrically accurate depth estimates of monocular images based on the single scale factor.

12. The system of claim 11, wherein the range sensor produces a sparse point cloud, wherein the measure of central tendency for each point comprises an error.

13. The system of claim 12, wherein the range sensor is a radar sensor.

14. The system of claim 11, wherein the method further comprises:
generating a point cloud from the first monocular image, the point cloud comprises points based on the depth values for a plurality of pixels derived from the depth model, wherein the depth map is based on the point cloud of the first monocular image.

15. The system of claim 11, wherein determining the single scale factor from the depth map of the first monocular image and the sparse point cloud generated by a range sensor comprises:
estimating a first scale for the first monocular image based on predicted depth values from the depth map, the first scale being a single first scale for the image.

16. The system of claim 15, wherein the method further comprises:
determining a pixel-wise scale for each of the plurality of the pixels of the first monocular image based on a depth value of each respective pixel; and
determining a measure of central tendency of the pixel-wise scales, wherein the first scale is estimated based on the determined measure of central tendency.

17. The system of claim 15, wherein determining the single scale factor from the depth map of the first monocular image and the sparse point cloud generated by a range sensor comprises:
receiving depth data captured by a range sensor, the depth data comprising the sparse point cloud representing a scene of an environment of the first monocular image, the point cloud comprising depth measures for a plurality of points of the point cloud; and
determining a second scale for the point cloud based on the depth measures, the second scale is a single second scale for the depth data.

18. The system of claim 17, wherein the method further comprises:
determining a point-wise scale for each of the plurality of the points of the point cloud based on a depth measure of each respective point; and
determining a measure of central tendency of the point-wise scales, wherein the second scale is estimated based on the determined measure of central tendency.

19. The system of claim 17, wherein the depth measure for each point comprises an error, the method further comprising:
determining that the error is greater than a threshold; and
in response to the determination that the error is greater than the threshold,
determining a plurality of scale factors for a plurality of images captured by an image sensor and a plurality of depth data captured by a radar sensor; and
determining an aggregate scale factor by aggregating the plurality of scale factors, wherein updating the depth model is based on the aggregate scale factor.

20. The system of claim 17, wherein the single scale factor is based on a comparison of the second scale with the first scale.

* * * * *